United States Patent
Shrivastava et al.

(10) Patent No.: US 12,332,917 B2
(45) Date of Patent: Jun. 17, 2025

(54) UNIVARIATE TIME SERIES SEGMENTATION USING PROXY VARIABLES AND SPARSE GRAPH RECOVERY ALGORITHMS

(71) Applicant: Microsoft Technology Licensing, LLC, Redmond, WA (US)

(72) Inventors: Harsh Shrivastava, Redmond, WA (US); Shima Imani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 18/189,933

(22) Filed: Mar. 24, 2023

(65) Prior Publication Data

US 2024/0411779 A1    Dec. 12, 2024

(51) Int. Cl.
| | |
|---|---|
| G06F 16/28 | (2019.01) |
| G06F 16/26 | (2019.01) |
| G06F 17/18 | (2006.01) |
| G06F 18/2323 | (2023.01) |

(52) U.S. Cl.
CPC ............ *G06F 16/285* (2019.01); *G06F 16/26* (2019.01); *G06F 18/2323* (2023.01)

(58) Field of Classification Search
CPC ..... G06F 16/285; G06F 16/26; G06F 18/2323
See application file for complete search history.

(56) References Cited

U.S. PATENT DOCUMENTS

| | | | | |
|---|---|---|---|---|
| 6,611,726 | B1* | 8/2003 | Crosswhite | G06Q 10/087 |
| | | | | 705/28 |
| 10,685,283 | B2* | 6/2020 | Li | G06F 16/285 |
| 11,037,022 | B2* | 6/2021 | Kumar | G06F 18/2321 |
| 11,263,172 | B1* | 3/2022 | Chang | G06F 16/128 |

(Continued)

FOREIGN PATENT DOCUMENTS

| | | | | |
|---|---|---|---|---|
| CN | 113657533 A | * | 11/2021 | ......... G06F 18/2321 |
| WO | WO-2020090770 A1 | * | 5/2020 | ............. G01D 21/02 |

OTHER PUBLICATIONS

Shrivastava et. al; "GLAD: Learning Sparse Graph Recovery" ICLR 2020 (Year: 2020).*

(Continued)

*Primary Examiner* — Dennis Truong
(74) *Attorney, Agent, or Firm* — Ray Quinney & Nebeker; Christopher K. Hallstrom

(57) ABSTRACT

This disclosure relates to a time series segmentation system that efficiently and accurately segments univariate time series data. For example, the time series segmentation system utilizes proxy variable time series to identify distinct segments in a univariate time series. To illustrate, the time series segmentation system generates proxy variables that approximate a univariate time series and combine with the time series to generate a supplemented multivariate time series. The time series segmentation system then divides the supplemented multivariate time series into portions using time-based windows, converts the windowed subsequences into graph objects using a sparse graph recovery model, utilizes a conditional similarity model to determine segmentation timestamps from the graph objects, and generates a segmented univariate time series from the segmentation timestamps.

20 Claims, 12 Drawing Sheets

(56) References Cited

U.S. PATENT DOCUMENTS

| | | | | |
|---|---|---|---|---|
| 2002/0010663 | A1* | 1/2002 | Muller | G06Q 40/00 |
| | | | | 705/30 |
| 2002/0099594 | A1* | 7/2002 | Heard | G06Q 20/10 |
| | | | | 706/12 |
| 2010/0211618 | A1* | 8/2010 | Anderson | G06F 16/2474 |
| | | | | 707/812 |
| 2013/0212142 | A1* | 8/2013 | Martinez Heras | G06F 17/17 |
| | | | | 708/290 |
| 2018/0150547 | A1* | 5/2018 | Pallath | G06N 20/20 |
| 2020/0125995 | A1* | 4/2020 | Wang | G06N 20/00 |
| 2020/0241490 | A1* | 7/2020 | Jermann | G05B 13/041 |
| 2020/0242483 | A1* | 7/2020 | Shashikant Rao | G06F 16/285 |
| 2021/0357431 | A1* | 11/2021 | Yang | G06Q 30/04 |
| 2022/0245409 | A1* | 8/2022 | Pavuluri | G06F 17/18 |
| 2022/0382856 | A1* | 12/2022 | Yang | G06F 21/552 |
| 2022/0383033 | A1* | 12/2022 | Courtney | G06F 18/15 |
| 2023/0333521 | A1* | 10/2023 | Holtan | G05B 13/021 |
| 2024/0054041 | A1* | 2/2024 | Nagar | G06F 11/0787 |
| 2024/0168975 | A1* | 5/2024 | Gill | G06F 16/285 |

OTHER PUBLICATIONS

Guijo-Rubio et al. ; "Time-Series Clustering Based on the Characterization of Segment Typologies", IEEE Transactions on Cybernetics, vol. 51, No. 11, Nov. 2021 (Year: 2021).*

Manfred Mudelsee; "Trend analysis of climate time series: A review of methods"; Earth-Science Reviews 190 (2019) 310-322 (Year: 2019).*

Bradley, Elizabeth, and Holger Kantz. "Nonlinear time-series analysis revisited." arXiv preprint arXiv:1503.07493 (2015) (Year: 2015).*

Svensson, et al. "An Evaluation of Methods for Combining Univariate Time Series Forecast"; Lund University, Bachelor's thesis in Statistics, Apr. 2018, 49 pages (Year: 2018).*

Hima Imani , Harsh Shrivastava "Are uGLAD? Time will tell!"; Microsoft Research, Redmond, USA; License: CC BY-NC-ND 4.0; arXiv:2303.11647v2 [cs.LG] Oct. 22, 2024 (Year: 2024).*

Aluru, et al., "EnGRaiN: A Supervised Ensemble Learning Method for Recovery of Large-Scale Gene Regulatory Networks", In Journal of Bioinformatics, vol. 38, Issue 5, Dec. 9, 2021, pp. 1312-1319.

Aminikhanghahi, et al., "A Survey of Methods for Time Series Change Point Detection", In Journal of Knowledge and information systems, vol. 51, Issue 2, May 2017, pp. 339-367.

Aoki, et al., "Segmentation of Human Upper Body Movement Using Multiple IMU Sensors", In Proceedings of the 38th Annual International Conference of the IEEE Engineering in Medicine and Biology Society, Aug. 16, 2016, pp. 3163-3166.

Deldari, et al., "Espresso: Entropy and Shape Aware Time-Series Segmentation for Processing Heterogeneous Sensor Data", In Proceedings of the ACM on Interactive, Mobile, Wearable and Ubiquitous Technologies, Sep. 4, 2020, 24 Pages.

Ermshaus, et al., "ClaSP—Parameter-free Time Series Segmentation", In Repository of arXiv:2207.13987v2, Nov. 18, 2022, 43 Pages.

Friedman, et al., "Sparse inverse covariance estimation with the graphical lasso", In Journal of Biostatistics, vol. 9, Issue 3, Dec. 12, 2007, pp. 432-441.

Gharghabi, et al., "Domain Agnostic Online Semantic Segmentation for Multi-Dimensional Time Series", In Proceedings of Data Mining and Knowledge Discovery, Jan. 15, 2019, pp. 96-130.

Hallac, et al., "Greedy Gaussian Segmentation of Multivariate Time Series", In Proceedings of the Advances in Data Analysis and Classification, Sep. 1, 2019, pp. 727-751.

Hallac, et al., "Network Inference via the Time-Varying Graphical Lasso", In Proceedings of the 23rd ACM SIGKDD International Conference on Knowledge Discovery and Data Mining, Aug. 13, 2017, pp. 205-213.

Harguess, et al., "Semantic Labeling of Track Events using Time Series Segmentation and Shape Analysis", In Proceedings of the 16th IEEE International Conference on Image Processing, Nov. 7, 2009, pp. 4317-4320.

Haury, et al., "TIGRESS: Trustful Inference of Gene REgulation using Stability Selection", In Journal of BMC Systems Biology, vol. 6, Issue 1, Nov. 22, 2012, 17 Pages.

Imani, et al., "Multi-Window-Finder: Domain Agnostic Window Size for Time Series Data", In Proceedings of the MileTS 21, Aug. 14, 2021, 5 Pages.

Keadle, et al., "Validation of Wearable Monitors for Assessing Sedentary Behavior", In Journal of Medicine & Science in Sports & Exercise, vol. 43, Issue 8, Aug. 1, 2011, pp. 1561-1567.

Koller, et al., "Probabilistic Graphical Models: principles and techniques", Published by MIT Press, Jul. 31, 2009, 16 Pages.

Lan, et al., "Automated Human Motion Segmentation via Motion Regularities", In Proceedings of the Visual Computer, Jan. 31, 2015, pp. 35-53.

Lin, et al., "Movement Primitive Segmentation for Human Motion Modeling: A Framework for Analysis", In Proceedings of the IEEE Transactions on Human-Machine Systems, Jan. 7, 2016, pp. 325-339.

Moerman, et al., "GRNBoost2 and Arboreto: Efficient and Scalable Inference of Gene Regulatory Networks", In Journal of Bioinformatics, vol. 35, Issue 12, Nov. 15, 2018, pp. 2159-2161.

Omranian, et al., "Segmentation of Biological Multivariate Time-Series Data", In Journal of Scientific Reports, vol. 5, Issue 1, Mar. 11, 2015, 6 Pages.

Pu, et al., "Learning to Learn Graph Topologies", In Journal of Advances in Neural Information Processing Systems, vol. 34, Dec. 6, 2021, 14 Pages.

Reinhardt, et al., "Predicting the Power Consumption of Electric Appliances through Time Series Pattern Matching", In Proceedings of the 5th ACM Workshop on Embedded Systems For Energy-Efficient Buildings, Nov. 11, 2013, 2 Pages.

Rolfs, et al., "Iterative Thresholding Algorithm for Sparse Inverse Covariance Estimation", In Proceedings of Advances in Neural Information Processing Systems, Dec. 3, 2012, 9 Pages.

Serra, et al., "Unsupervised Music Structure Annotation by Time Series Structure Features and Segment Similarity", In Proceedings of the IEEE Transactions on Multimedia, Mar. 11, 2014, pp. 1229-1240.

Shafer, et al., "Clasp—Time Series Segmentation", In Proceedings of the 30th ACM International Conference on Information & Knowledge Management, Oct. 26, 2021, pp. 1578-1587.

Shrivastava, et al., "A Deep Learning Approach to Recover Conditional Independence Graphs", In Proceedings of the NeurIPS Workshop: New Frontiers in Graph Learning, Dec. 2, 2022, 16 Pages.

Shrivastava, et al., "GLAD: Learning Sparse Graph Recovery", In Repository of arXiv:1906.00271v1, Jun. 1, 2019, 20 Pages.

Shrivastava, et al., "GRNUlar: A Deep Learning Framework for Recovering Single-Cell Gene Regulatory Networks", In Journal of Computational Biology, vol. 29, Issue 1, Jan. 1, 2022, pp. 27-44.

Shrivastava, et al., "Grnular: Gene Regulatory Network Reconstruction Using Unrolled Algorithm From Single Cell RNA-Sequencing Data", In Repository of bioRxiv, Apr. 25, 2020, 10 Pages.

Shrivastava, et al., "Methods for Recovering Conditional Independence Graphs: A Survey", In Repository of arXiv:2211.06829v1, Nov. 13, 2022, 14 Pages.

Shrivastava, et al., "Neural Graph Revealers", In Repository of arXiv:2302.13582v2, Feb. 28, 2023, 13 Pages.

Shrivastava, et al., "Neural Graphical Models", In Repository of arXiv:2210.00453v1, Oct. 2, 2022, 16 Pages.

Shrivastava, Harsh, "On using Inductive Biases for Designing Deep Learning Architectures", A Dissertation Submitted for the Partial Fulfillment of the Requirements for the Degree Doctor of Philosophy in Machine Learning, Georgia Institute of Technology, May 2021, 135 Pages.

Shrivastava, et al., "uGLAD: Sparse Graph Recovery by Optimizing Deep Unrolled Networks", In Repository of arXiv:2205.11610v1, May 23, 2022, 17 Pages.

Thu, et al., "Inferring Regula-Tory Networks from Expression Data Using Tree-Based Methods", In Journal of PloS one, vol. 5, Issue 9, Sep. 28, 2010, 10 Pages.

Yeh, et al., "Matrix Profile I: All Pairs Similarity Joins for Time Series: A Unifying View That Includes Motifs, Discords and Shapelets",

(56) References Cited

OTHER PUBLICATIONS

In Proceedings of IEEE 16th International Conference on Data Mining, Dec. 12, 2016, pp. 1317-1322.
Imani, et al., "Are uGLAD? Time will tell!", arXiv preprint arXiv:2303.11647, Mar. 21, 2023, pp. 1-10.
International Search Report and Written Opinion received for PCT Application No. PCT/US2024/019625, Jul. 11, 2024, 14 pages.
Li, et al., "Integrated Data Augmentation for Accelerometer Time Series in Behavior Recognition: Roles of Sampling, Balancing, and Fourier Surrogates", IEEE Sensors Journal, vol. 22, Issue 24, Nov. 9, 2022, pp. 24230-24241.

\* cited by examiner

UNIVARIATE TIME SERIES SEGMENTATION USING PROXY VARIABLES AND SPARSE GRAPH RECOVERY ALGORITHMS

BACKGROUND

Time series segmentation involves dividing a time series into multiple segments based on various patterns or characteristics, providing several benefits such as managing long time series effectively and identifying unexpected patterns and trends in data. However, conventional systems often fall short when it comes to segmenting time series data. For instance, despite many conventional systems focusing on univariate cases where a time series includes one variable, these conventional systems use complex approaches that require larger amounts of computing and memory resources. Additionally, these and other conventional systems inaccurately fail to identify salient patterns in univariate time series data. Indeed, such systems are inefficient in their approach to time series segmentation of univariate time series data.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
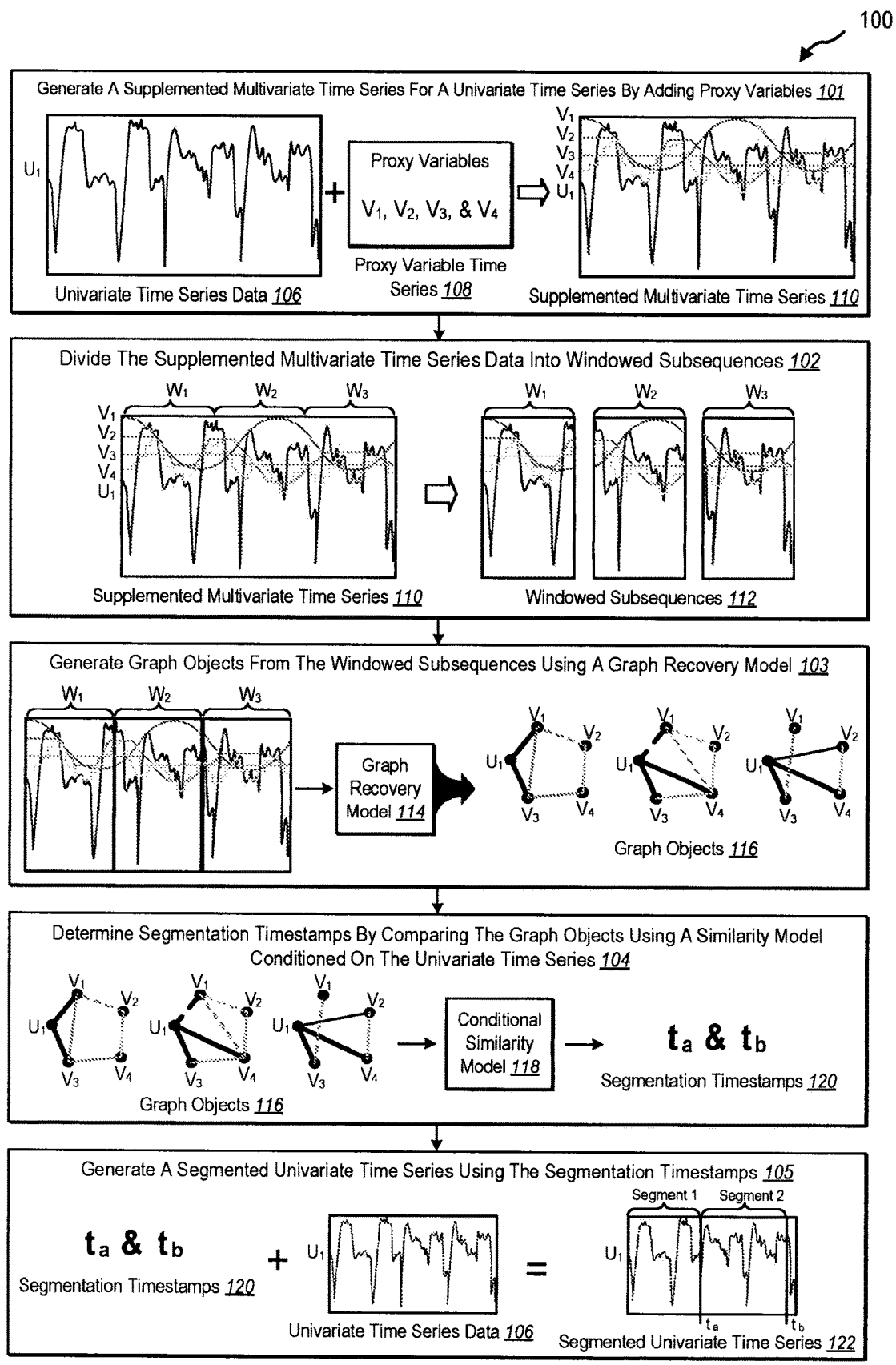
FIG. 1 illustrates an example overview of implementing a time series segmentation system to segment univariate time series data in accordance with one or more implementations.

The present disclosure presents a time series segmentation system that efficiently and accurately segments univariate time series data. Unlike conventional systems that have a quadratic time complexity based on time series length, the time series segmentation system efficiently has a linear time complexity, which makes it well-suited for processing large datasets without experiencing significant slowdowns or errors.

To briefly elaborate, the time series segmentation system utilizes proxy variable time series to identify distinct segments efficiently and accurately in a single, univariate data sequence. The time series segmentation system generates a supplemented multivariate time series data by adding proxy variable time series ("proxy variables") to a univariate time series, utilizing a range of techniques and models. The time series segmentation system then employs time-based windows to divide and group the supplemented multivariate time series into portions and a graph recovery model to convert the windowed subsequences into graph objects. Furthermore, it uses a conditional similarity model conditioned on the univariate time series to determine segmentation timestamps from the graph objects, which are used to convert the univariate time series into a segmented univariate time series.

As indicated above, time series data is commonly used in various industries and areas including healthcare, engineering, manufacturing, scientific research, finance, health tracking, weather, environmental surveys, and physiological studies, among others. For instance, it helps monitor patients' vital signs and track their health progress, and individuals often use health tracking devices that collect univariate time series data on parameters such as the number of steps, travel distance, elevation changes, oxygen levels, heart rate, move time, and calories expended.

Despite its widespread usage, accurately analyzing univariate time series data can be challenging due to its sparseness. Many conventional systems are primarily designed for univariate time series segmentation; however, their performance remains unsatisfactory due to inefficiencies. The disclosed implementations of the time series segmentation system overcome these challenges by providing an efficient and accurate time series segmentation system for univariate time series data.

As described in this document, the time series segmentation system delivers several technical benefits in terms of computing efficiency and accuracy compared to existing systems. Moreover, the time series segmentation system provides several practical applications that solve problems associated with segmenting univariate time series data, resulting in several benefits.

To illustrate, the time series segmentation system employs various models, including proxy variables and graph objects, to efficiently and accurately generate segmented univariate time series data. The system intelligently selects, generates, and incorporates proxy variables (proxy variable time series) with a univariate time series to create a supplemented multivariate time series. Furthermore, the system efficiently generates graph objects from short intervals of the univariate time series data using a graph recovery model. These graph objects can exhibit conditional independence (CI), which are probabilistic graphical models that include nodes connected by edges to partial correlations between the nodes. Additionally, the time series segmentation system determines segmentation timestamps from the graph objects using a conditional similarity model.

By utilizing proxy variables and generating supplemented multivariate time series, the time series segmentation system more accurately determines segmented time series in univariate time series data. Additionally, by providing multiple data points along a sequence, the proxy variables emphasize and reveal points in the univariate time series that other models would miss.

Compared to conventional systems that require $O(N^2)$ operations at best, the time series segmentation system achieves segmented univariate time series in $O(N)$ operations by converting the input time series into a temporal dependency graph objects sequence using a graph recovery model. The system generates a segmented univariate time series on a linear scale, in terms of time and computational complexity based on sequence length unlike conventional systems that typically require a quadratic scale. This is a significant improvement and offers practical advantages for efficiently processing large datasets.

Additionally, the time series segmentation system further reduces computing costs by focusing only on connections with the univariate time series data. For example, similarity modes are conditioned to only process graph objects that include the univariate time series when determining similarities as well as tracking patterns and trends. The time series segmentation system can ignore changes in connections between pairs of graph object nodes that do not include a node for the univariate time series.

Moreover, the time series segmentation system also accommodates a wide range of data types and sets by using conditional independence (CI) graphs and other types of graph objects. In various implementations, the time series segmentation system employs a cross-domain and/or domain-agnostic univariate segmentation framework that draws a parallel between the graph nodes and the variables of the time series. Additionally, the combination of flexibility and efficiency in the time series segmentation system makes it highly scalable on any size of dataset.

The time series segmentation system further improves efficiency over conventional systems by enabling batch processing, in addition to utilizing graph objects. In various implementations, the system employs deep-learning sparse graph recovery models like uGLAD, which can convert any number of windowed subsequences into graph objects using a single model with shared parameters, without requiring parallel processing (i.e., not performed by multiple model instances in parallel). By creating a batch of intervals and executing a single run of the uGLAD model in multitask learning mode, the time series segmentation system recovers all graph objects simultaneously, resulting in corresponding temporal graph objects that accurately represent the univariate time series.

Additionally, the use of graph objects in the time series segmentation system provides interpretable functionality, which is critical for many entities analyzing real-world time series data. Unlike many conventional systems that utilize sparse matrices without indicating how variables and values are correlated, the graph objects generated and utilized by the time series segmentation system offer greater interpretability. This is especially important in indicating relationships between the univariate time series and various proxy variables over time.

This disclosure uses several terms to describe the features and advantages of one or more implementations. For instance, "univariate time series data" refers to a collection or sequence of data points for a single variable recorded at different points in time. The variable can include a wide range of data types, such as numerical, categorical, and text data.

In addition, the term "segmented univariate time series" refers to a univariate time series that includes indications of segmented portions of the univariate time series within the data. In this document, a segment refers to a consecutive portion of data that corresponds to the same or similar activity or event, which is distinct from just consecutive data within a time window (which is discussed below as a subsequence or windowed time data). A segment can be identified by consistent temporal patterns among the consecutive data points in a univariate time series.

The term "proxy variable time series" (or simply "proxy variables") refers to a time series of data points that complements a univariate time series. In many instances, proxy variables approximate data points, trends, and patterns of a univariate time series. For example, a proxy variable is generated by applying one or more functions to the univariate time series or may be based on functions that are independent of the univariate time series. (e.g., $\sin(\theta)$). In some instances, a proxy variable serves as a surrogate variable to a univariate time series.

Proxy variables include various types of time series such as approximations of a univariate time series. Proxy variables may be linear-, quadratic-, polynomial-, or spline-based sequences, for instance. Some examples of proxy variables include a time series interpolated from a univariate time series (e.g., an approximation time series based on linear or non-linear interpolation), regression-based and/or trend approximations of a univariate time series, fixed or polynomial variables that are not based or interpolated from a univariate time series, or statistical function such as mean or average functions. Additional details regarding proxy variables are provided below.

In this document, the term "supplemented multivariate time series" refers to a multivariate time series that includes a univariate time series and at least one proxy variable (i.e., proxy variable time series). A supplemented multivariate time series can include any number of proxy variables that accompany a univariate time series for a duration of time.

A "subsequence" is a subset or smaller section of a larger sequence. In the context of a univariate time series and/or a supplemented multivariate time series, a subsequence is a local section of the time series that consists of a continuous subset of its values. For example, a subsequence $T_{i,M}$ of a supplemented multivariate time series T is a continuous subset of the values from T of length M starting from position i. For instance, the subsequence $T_{i,M}$ is represented as $T_{i,M} = t_i, t_{i+1}, \ldots, t_{i+M-1}$, where $1 \leq i \leq N-M+1$.

A "windowed subsequence" refers to a subsequence selected from a supplemented multivariate time series based on a window of fixed size and sliding location. The windowed subsequence moves through the time series with a specified step size (e.g., stride length), allowing for a set of overlapping subsequences to be extracted. The type, location, movement pattern, and size of a window depend on numerous factors, which are provided below. For instance, smaller window sizes with larger overlaps may capture finer-grained patterns but may result in a larger number of subsequences and higher computational complexity. Conversely, larger window sizes and smaller overlaps may result in a smaller number of subsequences but may miss finer-grained patterns.

Regarding windows (i.e., moving or sliding temporal windows), a "stride length" refers to the number of data points that a window shifts or moves to capture different windowed subsequences. For example, the stride length indicates how much a window shifts from a current starting position in the supplemented multivariate time series to the next starting position between window captures. To illustrate, a stride length s indicates that if the current subsequence is located at $T_{i,M}$ where i is the starting position of the subsequence from the supplemented multivariate time series T with length M, then, the next subsequence is $T_{i+s,M}$ with the starting position at i+s.

An "graph object" refers to a visual tool used to visualize relationships between concepts in time series data. A graph object may take the form of a graph, chart, or table showing relationships between various variables, features, or concepts. Graph objects can be represented as an adjacency list or adjacency matrix. A graph object includes both positive and negative partial correlations between variables. For instance, a connection, shown as an edge in a graph object or an entry in a matrix, can range in correlation strength from [−1, 1] and different visual effects, such as colors, thicknesses, and patterns can be used to show the magnitudes of connection strength or other correlation scores between variables.

A "timestamp" refers to a unique identifier that represents a specific point in time within a sequence of a univariate time series. A timestamp includes a data structure that includes information about a specific time in a time series dataset. Similarly, the term "segmentation timestamp" refers to a (proposed or actual) starting or ending point of a segment within a segmented univariate time series.

As used herein, the term "sparse graph recovery" refers to recovering a graph object from data sources. For example, a sparse graph recovery model recovers graph objects from time series data (e.g., subsequences of time series data) by discovering a probabilistic graphical model that potentially shows sparse connections between the D feature of an input sample. Sparse graph recovery models range from generic optimization based sparse graph recovery models to deep-learning sparse recovery models, such as uGLAD.

The term "conditional independence graph objects" (or CI graph objects) refers to a graph object that displays a partial correlation between nodes (or features). For instance, a partial correlation captures a direct dependency between the features (e.g., variables) as it is the conditional probability of the features under consideration given all the other features. In other words, a CI graph object represents dependencies between variables in a univariate time series while considering the dependencies on other variables.

As used herein, the term "precision matrix" refers to a matrix that correlates variables/concepts/features to other variables/concepts/features within a window of a multivariate time series. In various implementations, a precision matrix is an information matrix that is the inverse of the covariance matrix and is used to model the conditional dependencies between variables in a graphical model. In some cases, the precision matrix can also capture latent correlations between variables.

Additionally, the term "conditional similarity model" refers to one or more functions, algorithms, and/or processes for comparing graph objects relative to a univariate time series. In various implementations, a conditional similarity model includes a trajectory tracking algorithm that analyzes how the univariate time series, represented in graph objects, evolve over intervals to determine segmentation information for the univariate time series.

As used herein, the term "machine learning" refers to algorithms that generate data-driven predictions or decisions from known input data by modeling high-level abstractions. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandit models, linear regression models, logistical regression models, random forest models, support vector machines (SVMs) models, neural networks (convolutional neural networks, recurrent neural networks such as LSTMs, graph neural networks, etc.), or decision tree models.

Additionally, a machine-learning model can include a sparse graph recovery machine-learning model (or simply "model" as used hereafter) that determines correlation strengths between pairs of concepts within sets of digital documents. In some implementations, the sparse graph recovery machine-learning model is a neural network that includes multiple neural network layers. In various implementations, the sparse graph recovery machine-learning model includes a uGLAD model, which is a deep model that solves the graphical lasso objective with improved guarantees in terms of sample complexity and capturing tail distributions.

Additionally, this disclosure describes a time series segmentation system in the context of a network. In this disclosure, a "network" is defined as one or more data links that enable electronic data transport between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

Note that although this disclosure focuses on utilizing the time series segmentation system to segment a univariate time series, the same approaches, methods (including computer-implemented methods), and systems can be applied to multivariate time series data. In other words, the time series segmentation system generates and applies proxy variables to one or more time series within a multivariate time series as disclosed for the univariate time series.

Additional details regarding an example implementation of the time series segmentation system are discussed in connection with the following figures. For example, FIG. 1 illustrates an example overview for implementing a time series segmentation system to segment univariate time series data in accordance with one or more implementations. As shown, FIG. 1 includes a series of acts 100 that, in many instances, are performed by a time series segmentation system.

To illustrate, the series of acts 100 includes an act 101 of generating a supplemental time series for a univariate time series by adding proxy variables. For example, the time series segmentation system identifies univariate time series data 106, which may have been received from a data source. In some instances, the time series segmentation system is unable to accurately segment the univariate time series due to sparse data points and the difficulty of identifying trends or patterns. Accordingly, as shown, the time series segmentation system generates proxy variable time series 108 (e.g., one or more proxy variables) for the univariate time series data 106. Further, the time series segmentation system combines the proxy variable time series 108 with the univariate time series to generate a supplemented multivariate time series 110. Additional details regarding generating a supplemented multivariate time series by adding proxy variables to a univariate time series are provided below in connection with FIG. 3.

As shown, the series of acts 100 includes an act 102 of dividing supplemented multivariate time series data into windowed subsequences. For example, the time series segmentation system receives a supplemented multivariate time series 110. Based on a predetermined window size and type, the time series segmentation system generates windowed subsequences 112 (e.g., $W_1$, $W_2$, and $W_3$) by dividing the supplemented multivariate time series into groups. In various implementations, the time series segmentation system utilizes a fixed window size or length. Additional details regarding generating windowed subsequences from a supplemented multivariate time series are provided below in connection with FIG. 4.

As depicted, the series of acts 100 includes an act 103 of generating graph objects from the windowed subsequences using a graph recovery model. For example, the time series segmentation system utilizes a graph recovery model 114 to recover graph objects 116 of the supplemented multivariate time series from the windowed subsequences 112. The time series segmentation system may generate the graph objects 116 by processing each windowed subsequence independently and/or individually using the graph recovery model 114 in a serial or parallel order. In other instances, the time series segmentation system utilizes the graph objects 116 to process all the windowed subsequences 112 as a single batch simultaneously. Additional details regarding recovering graph objects using a graph recovery model are provided below in connection with FIG. 5. Additional details regarding batch mode processing are provided below in connection with FIG. 9.

FIG. 1 also shows that the series of acts 100 includes an act 104 of determining segmentation timestamps by comparing the graph objects using a conditional similarity model. For example, the time series segmentation system utilizes a conditional similarity model 118 to determine segmentation timestamps 120 by analyzing and comparing the graph objects 116 with respect to the univariate time series (e.g., based on interactions between the univariate time series data points and corresponding data points of connected proxy variable). A segmentation timestamp indicates when the data points in a subsequence of the univariate time series change temporal patterns or shapes. Additional details regarding determining segmentation timestamps using a conditional similarity model are provided below in connection with FIG. 6.

As depicted, the series of acts 100 includes an act 105 of generating a segmented univariate time series using the segmentation timestamps. For example, the time series segmentation system incorporates or applies the segmentation timestamps 120 to the univariate time series data 106 to generate a segmented univariate time series 122 that includes indications when different segments occur. Additional details regarding generating segmented univariate time series are provided below in connection with FIG. 7.

Figure 2A:
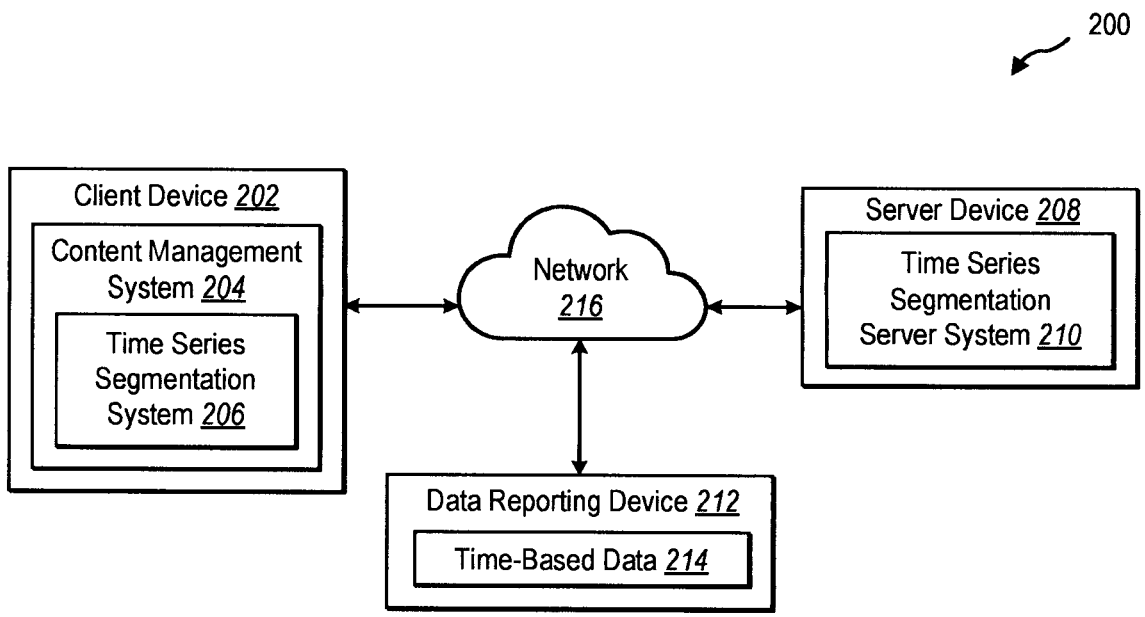
FIGS. 2A-2B illustrate an example system environment where a time series segmentation system is implemented for segmenting univariate time series data in accordance with one or more implementations.
Figure 2B:
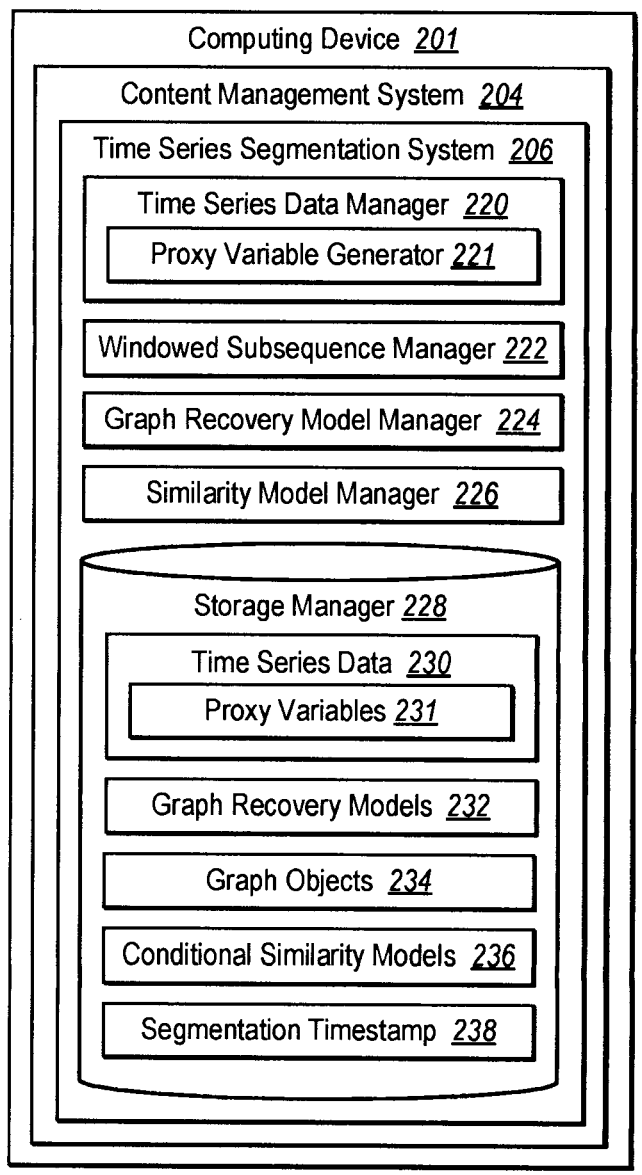

With a general overview of the time series segmentation system in place, additional details are provided regarding the components and elements of the time series segmentation system. To illustrate, FIGS. 2A-2B illustrate an example system environment where a time series segmentation system is implemented in accordance with one or more implementations. While FIGS. 2A-2B show example arrangements and configurations with respect to the time series segmentation system, other arrangements and configurations are possible.

As shown, FIG. 2A includes an environment 200 of a computing system having a client device 202, a server device 208, and a data reporting device 212, which are connected by a network 216. Further details regarding these and other computing devices are provided below in connection with FIG. 11. In addition, FIG. 11 also provides additional details regarding networks, such as the network 216 shown.

In various implementations, the client device 202 is associated with a user (e.g., a user client device), such as a user who interacts with a time series segmentation system 206 to request a segmented univariate time series. As shown, the client device 202 includes a content management system 204, which performs a variety of functions. For example, in one or more implementations, the content management system 204 facilitates the receiving, storage, and access of time series data, including univariate time series data.

As shown, the content management system 204 includes a time series segmentation system 206, which may be located outside of the content management system 204. In various implementations, the time series segmentation system 206 generates segmented univariate time series based on windowed subsequences, graph recovery models, graph objects, similarity models, and segmentation timestamps. Additional details and components of the time series segmentation system 206 are provided below in FIG. 2B.

As just mentioned, the content management system 204 may receive and store univariate time series data for the time series segmentation system 206 to process. In various implementations, the content management system 204 receives time-based data 214 from a data reporting device 212, which collects, monitors, identifies, tracks, and/or records the time-based data 214 as univariate time series data. In various implementations, the content management system 204 and/or the time series segmentation system 206 includes the data reporting device 212 to monitor and collect time-based data.

As shown, the environment 200 also includes the server device 208. The server device 208 includes a time series segmentation server system 210. For example, in one or more implementations, the time series segmentation server system 210 represents and/or provides similar functionality as described herein in connection with the time series segmentation system 206.

In some implementations, the time series segmentation server system 210 supports the time series segmentation system 206 on the client device 202. Indeed, in one or more implementations, the server device 208 includes all or a portion of the time series segmentation system 206. For instance, the time series segmentation system 206 on the client device 202 downloads and/or accesses an application from the server device 208 (e.g., one or more deep-learning models) or a portion of a software application.

In some implementations, the time series segmentation server system 210 includes a web hosting application that allows the client device 202 to interact with content and services hosted on the server device 208. To illustrate, in one or more implementations, the time series segmentation server system 210 implements the time series segmentation framework, which includes one or more machine-learning models. For example, the client device 202 (e.g., a mobile device) provides a univariate time series to the time series segmentation server system 210 on the server device 208, which provides back segmentation timestamps and/or a segmented univariate time series to the client device 202.

As mentioned above, FIG. 2B provides additional details regarding the capabilities and components of the time series segmentation system 206. To illustrate, FIG. 2B shows a computing device 201 that has the content management system 204 and the time series segmentation system 206. For example, the computing device 201 represents either the client device 202 and/or the server device 208 introduced above.

In addition, as shown, the time series segmentation system 206 includes various components and elements. For example, the time series segmentation system 206 includes a time series data manager 220 for accessing, collecting, and displaying univariate time series data as well as managing the univariate time series data (i.e., time series data 230). Additionally, as shown, the time series data manager 220 includes a proxy variable generator 221 for generating proxy variables 231 (i.e., proxy variable time series), which may be an example of the time series data 230 stored on the storage manager 228.

Further, the time series segmentation system 206 also includes a windowed subsequence manager 222, which generates windowed subsequences from univariate time series data. Moreover, the time series segmentation system 206 includes a graph recovery model manager 224, which utilizes graph recovery models 232 to generate graph objects 234 from the time series data 230. Additionally, the time series segmentation system 206 includes a conditional similarity model manager 226 that utilizes one or more conditional similarity models 236 to determine segmentation timestamps 238. Further, the time series segmentation system 206 includes a storage manager 228, which stores various pieces of data and/or models, as shown along with additional data not included in FIG. 2B.

Figure 4:
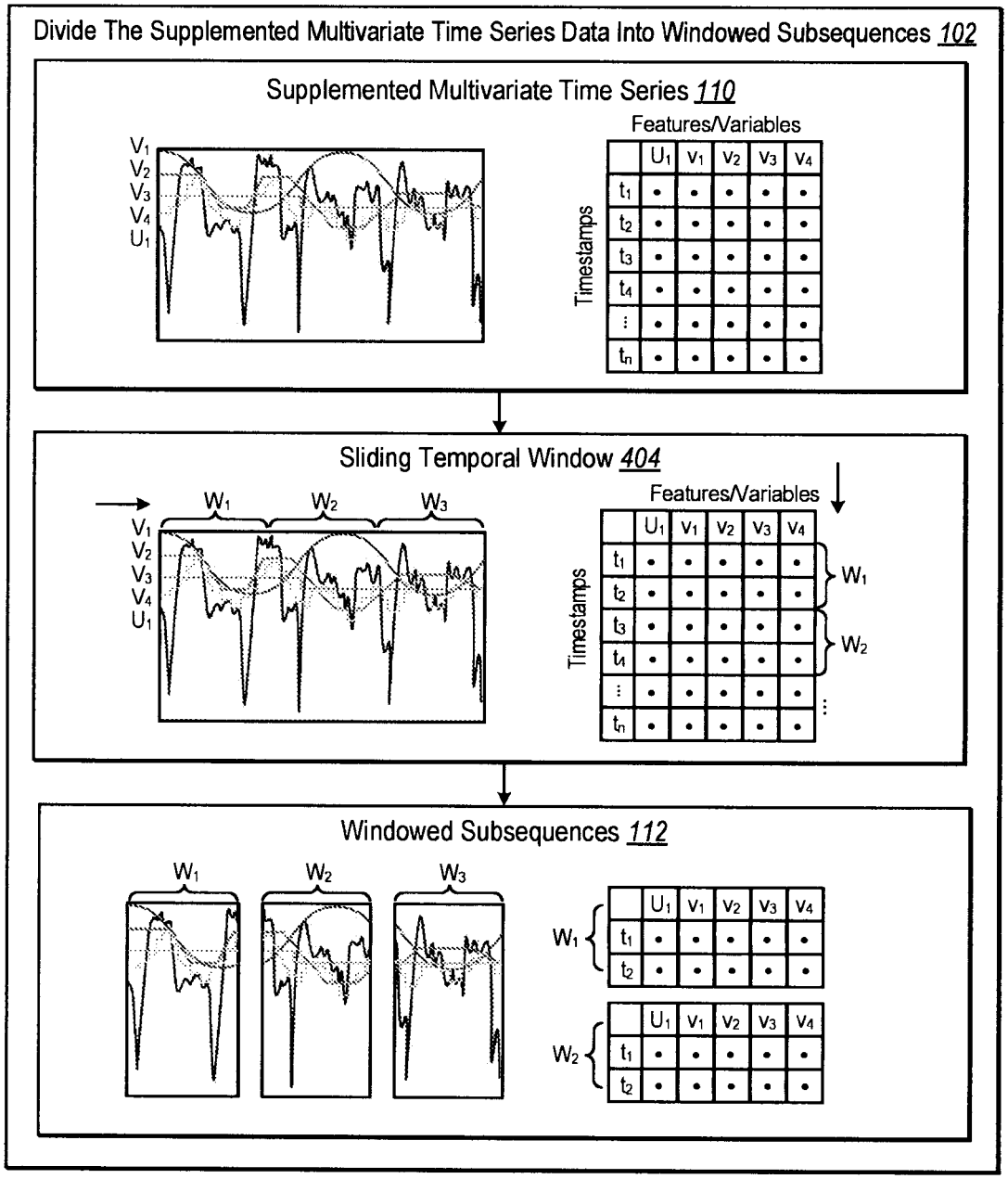
FIG. 4 illustrates an example process for dividing a univariate time series into windowed subsequences in accordance with one or more implementations.
Figure 5:
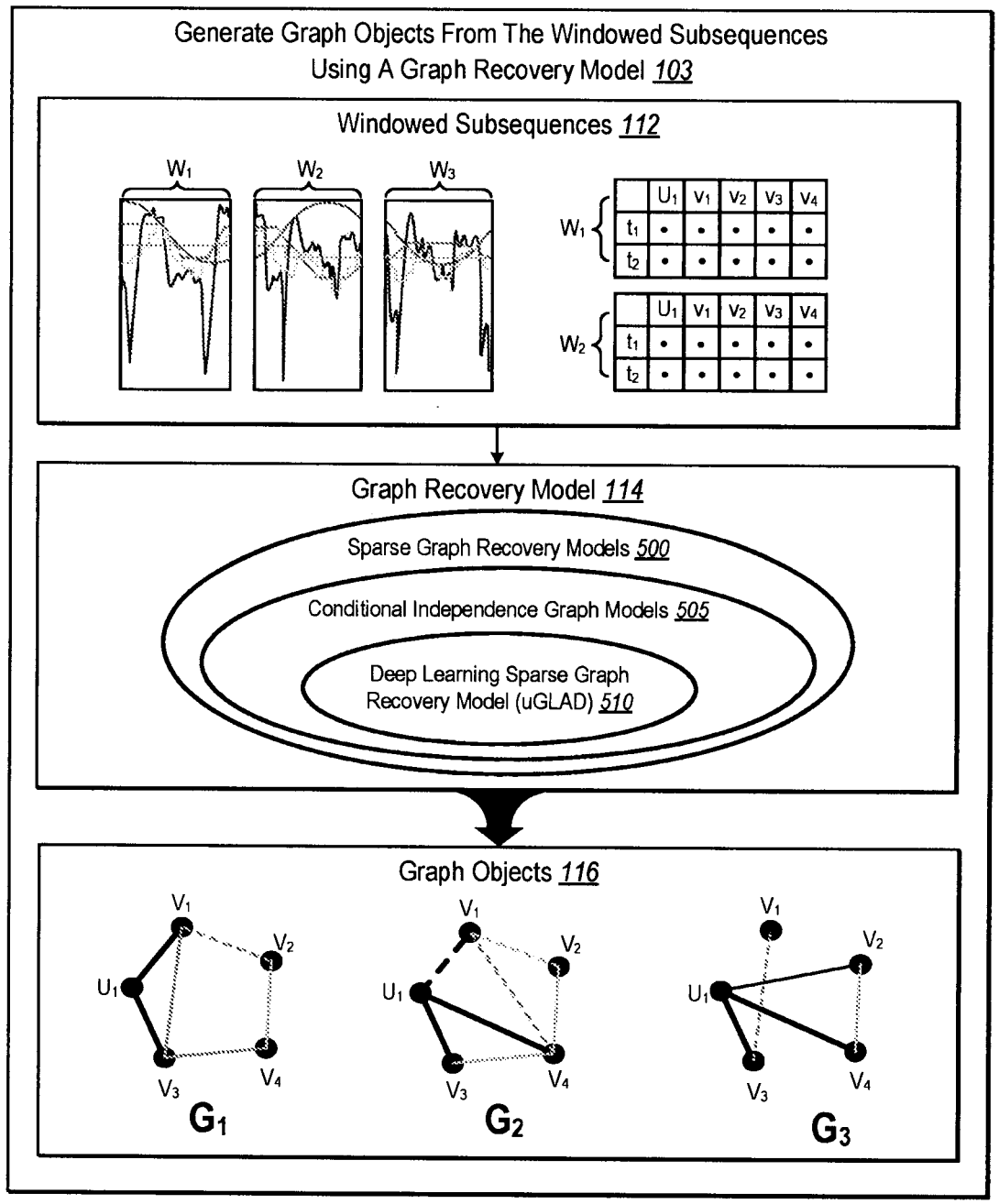
FIG. 5 illustrates an example process for generating graph objects from the windowed subsequences using a graph recovery model in accordance with one or more implementations.
Figure 6:
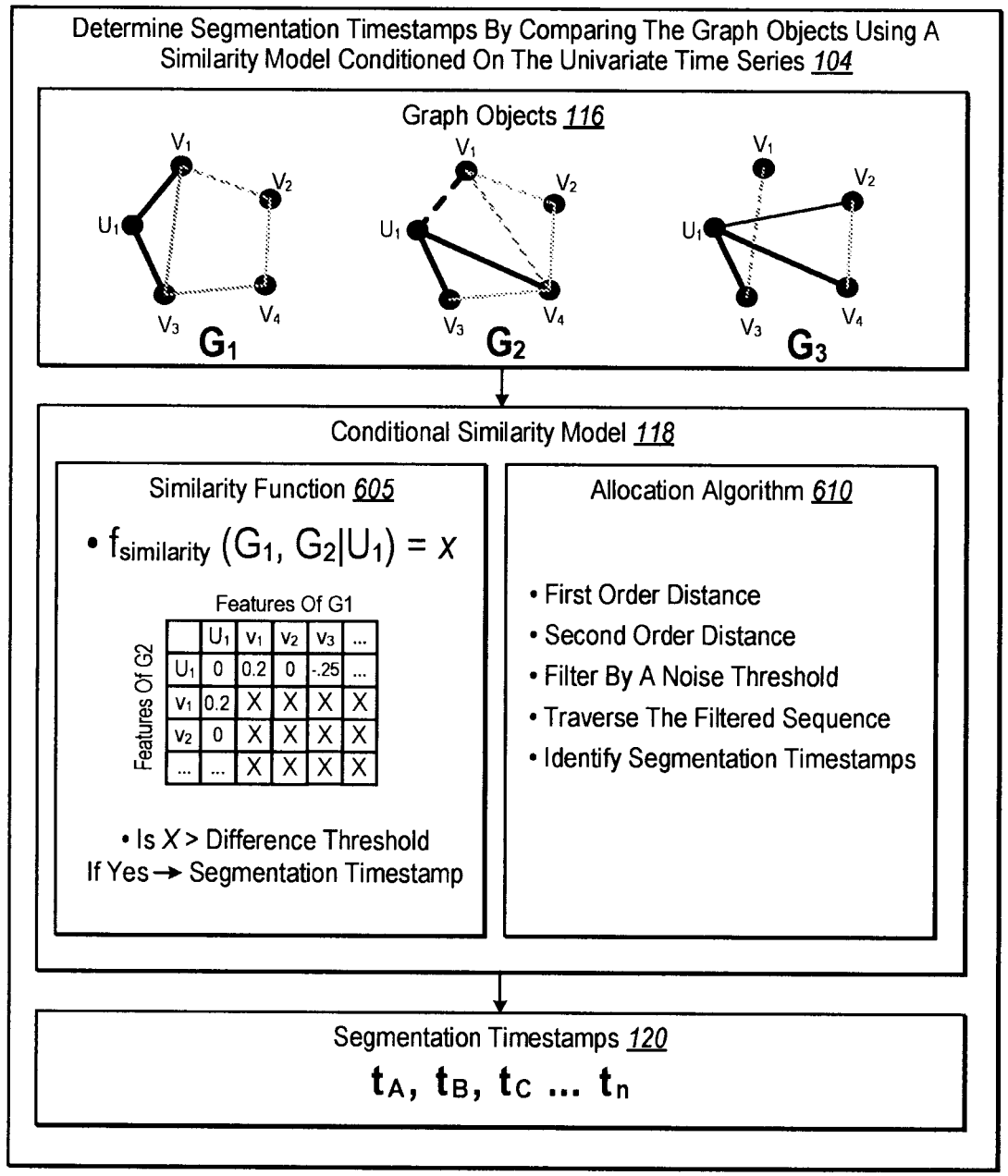
FIG. 6 illustrates an example process for determining segmentation timestamps using a conditional similarity model in accordance with one or more implementations.
Figure 7:
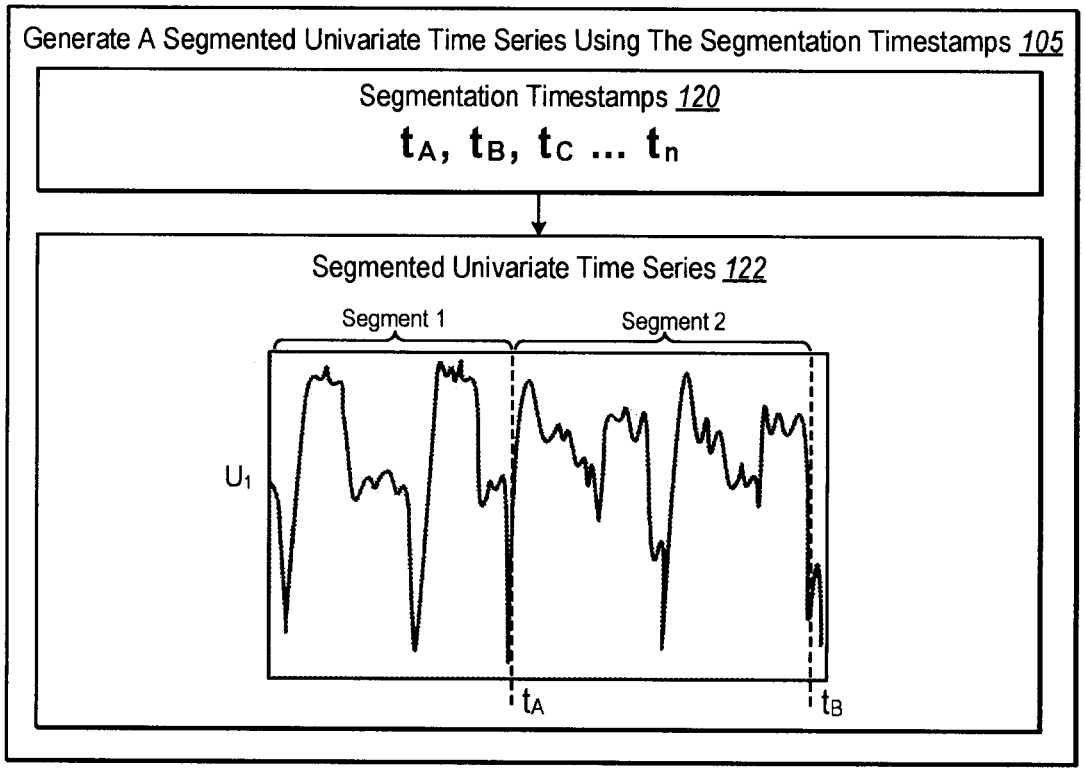
FIG. 7 illustrates an example process for generating a segmented univariate time series using the segmentation timestamps in accordance with one or more implementations.

With the foundation of the time series segmentation system 206 in place, additional details regarding various functions of the time series segmentation system 206 will now be described. As noted above, FIGS. 3-7 expand and provide additional details regarding the acts 101-105 described above. For example, FIG. 3 relates to generating supplemented multivariate time series by supplementing a univariate time series with proxy variables. FIG. 4 relates to dividing supplemented multivariate time series data into windowed subsequences. FIG. 5 relates to generating graph objects from the windowed subsequences using a graph recovery model. FIG. 6 relates to determining segmentation timestamps using a conditional similarity model. FIG. 7 relates to generating a segmented univariate time series using the segmentation timestamps in accordance with one or more implementations.

Figure 3:
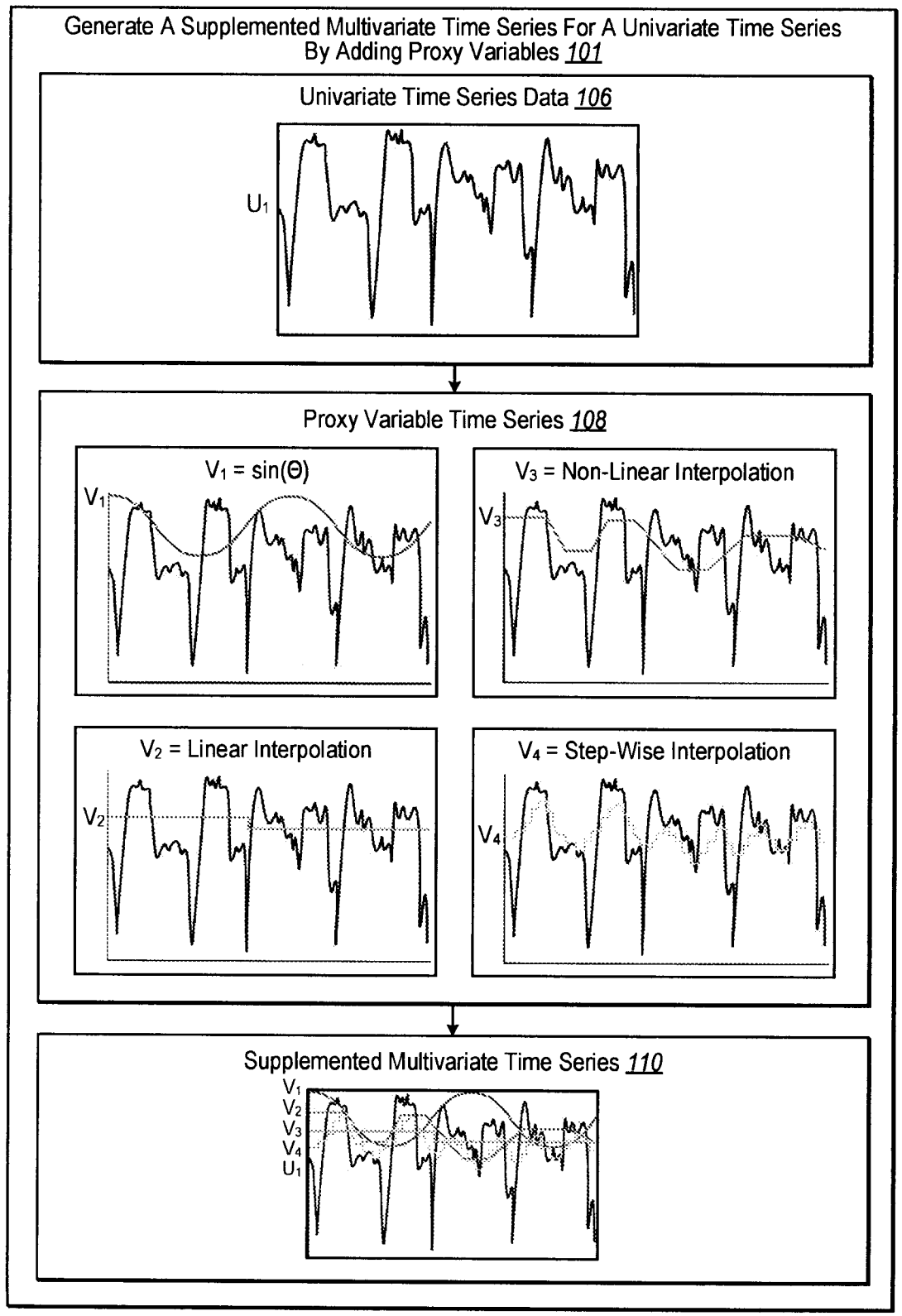
FIG. 3 illustrates an example process for generating a supplemented multivariate time series for a univariate time series in accordance with one or more implementations.

As just mentioned, FIG. 3 relates to generating a supplemented multivariate time series by supplementing a univariate time series with proxy variables. In particular, FIG. 3 illustrates an example process for generating a supplemented multivariate time series for a univariate time series in accordance with one or more implementations. As shown, FIG. 3 includes the act 101 of generating a supplemented multivariate time series for the univariate time series by adding proxy variables.

As illustrated in FIG. 3, the act 101 includes the univariate time series data 106, the proxy variable time series 108, and the supplemented multivariate time series 110, introduced above. For example, the time series segmentation system 206 generates the proxy variable time series 108 from the univariate time series data 106 (shown as the univariate time series $U_1$) and supplements the univariate time series data 106 with the proxy variables to generate the supplemented multivariate time series 110. Indeed, as shown, the time series segmentation system 206 generates the supplemented multivariate time series 110 by adding, augmenting, overlaying, and/or combining the proxy variable time series 108 with the univariate time series.

As noted above, proxy variables can include a wide range of time series types. For example, a proxy variable may be based on almost any function. In many instances, the time series segmentation system 206 generates a proxy variable by applying a function that includes the univariate time series, such as an interpolation or regression of the univariate time series. In some instances, the time series segmentation system 206 generates a proxy variable from a function or selects a previously generated proxy variable that does not include the univariate time series.

To illustrate, FIG. 3 shows that proxy variable time series 108 includes various example proxy variables shown as $v_1$, $v_2$, $v_3$, and $v_4$. As shown, $v_1$ is a first proxy variable generated by the function $x=\sin(\theta)$, $v_2$ is a second proxy variable generated by applying a linear interpolation to the univariate time series, $v_3$ is a third proxy variable generated by applying a non-linear interpolation to the univariate time series, and va is a fourth proxy variable generated by applying a step-wise interpolation to the univariate time series. As noted, the proxy variables in FIG. 3 are merely examples and the time series segmentation system 206 may generate and/or select many different types of proxy variables.

In some implementations, the time series segmentation system 206 generates a proxy variable based on a set of parameters, such as a sampling rate. For example, when interpolating proxy variables, the time series segmentation system 206 generates a first proxy variable by interpolating the univariate time series at a first sampling rate and generates a second proxy variable by interpolating the univariate time series at a second sampling rate, which yields a different approximation of the univariate time series.

Another example of a proxy variable parameter is the number of proxy variables. For example, the time series segmentation system 206 determines how many proxy variables to add to the univariate time series data 106 to generate the supplemented multivariate time series 110. The time series segmentation system 206 can add any number of proxy variables. In one instance, the time series segmentation system 206 adds 20 proxy variables. In another instance, the time series segmentation system 206 adds 6-10 proxy variables. Generally, the time series segmentation system 206 adds fewer proxy variables than the number of data points in a windowed subsequence, but the time series segmentation system 206 is designed to operate with any number of proxy variables.

In one or more implementations, the time series segmentation system 206 selects proxy variable parameters based on the data type of the time series. For instance, the time series segmentation system 206 selects a first set of proxy variables with which to supplement a univariate time series of a first data type and selects a second set of proxy variables with which to supplement a univariate time series of a second data type. For example, the time series segmentation system 206 applies a set of proxy variables to a fitness-based univariate time series and another set of proxy variables to a market-based univariate time series.

To further illustrate, in some implementations, the time series segmentation system 206 determines the data type for a univariate time series. For example, the time series segmentation system 206 performs a preliminary analysis of the univariate time series to determine its data type. For instance, the time series segmentation system 206 utilizes a time series machine-learning model to determine the data type from a portion of the univariate time series. In other examples, the time series segmentation system 206 accesses metadata indicating the data type. In some instances, the time series segmentation system 206 determines the data type from the data source (e.g., the data source is a fitness tracker). Then, based on the data type, the time series segmentation system 206 selects a set of proxy variables, which may include predefined parameters.

In various implementations, the time series segmentation system 206 modifies the proxy variables added to a supplemented multivariate time series 110 between segmentation instances of the univariate time series data 106. For example, the time series segmentation system 206 applies a first set of proxy variables on a first pass and a second set of proxy variables on a second pass, where the second set of proxy variables adds additional proxy variables and/or increases the sampling rate to one of the proxy variables. Additional details regarding this concept are provided below in connection with FIG. 8.

In some implementations, the time series segmentation system 206 prompts a user to select one or more proxy variables. For example, the time series segmentation system 206 provides an interactive interface that includes a list of proxy variables to be added to the univariate time series data 106. In various implementations, the list is ranked based on the data type of the univariate time series. In some instances, the interactive interface allows a user to specify proxy variable parameters, such as sampling rate along with window characteristics, which are discussed in the next figure.

One important consideration is that proxy variables should be non-correlated. For example, if two proxy variables are correlated, they maintain a constant correlation with each other over time (e.g., or the correlation is constant above a correlation deviation threshold). In these instances, the two proxy variables similarly influence the univariate time series. In other words, the proxy variables share a common correlation with the univariate time series over time, which inaccurately influences the univariate time series (e.g., it doubles the weight to the univariate time series across graph objects). Accordingly, the time series segmentation system 206 prevents and/or removes proxy variables that are correlated with each other.

In many cases, the univariate time series corresponds to events and actions that previously occurred. In these cases, the time series segmentation system 206 generates the supplemented multivariate time series 110 offline. In other implementations, the univariate time series includes adding data points in real time and the time series segmentation system 206 generates the windowed subsequences 112 in real-time or near real-time.

Additionally, in one or more implementations, the time series segmentation system 206 performs basic preprocessing on the univariate time series. For example, the time series segmentation system 206 performs missing value imputation using a forward-filling algorithm. In this way, the time series segmentation system 206 fills in missing data points and ensures that the time series data is complete before generating proxy variables and/or performing segmentation.

FIG. 4 relates to generating windowed subsequences from a supplemented multivariate time series. In particular, FIG. 4 illustrates an example process for dividing supplemented multivariate time series data into windowed subsequences in accordance with one or more implementations. As shown, FIG. 4 includes the act 102 of dividing supplemented multivariate time series data into the windowed subsequences introduced above. The act 102 is further described in connection with the various elements shown.

As shown in the act 102 in FIG. 4, the process of generating the windowed subsequences 112 includes the supplemented multivariate time series 110 and a sliding temporal window 404. For example, the act 102 starts with the time series segmentation system 206 generating or otherwise obtaining the supplemented multivariate time series 110.

As shown, the supplemented multivariate time series 110 may be represented visually as a graph. Additionally, in various instances, the supplemented multivariate time series 110 is represented in a table or in matrix form. For example, the supplemented multivariate time series 110 is stored as a matrix that plots values of data points of features/variables over time (i.e., recorded at predetermined timestamps). As shown, the precision matrix includes a column for the univariate time (i.e., $U_1$) and columns for each of the proxy variables ($v_1$, $v_2$, $v_3$, and $v_4$). Notably, while FIG. 4 shows dots in the matrix, each entry in the matrix of the supplemented multivariate time series 110 can include a value of a data point.

FIG. 4 also includes a sliding temporal window 404. In various implementations, the time series segmentation system 206 divides the supplemented multivariate time series 110 into multiple intervals (i.e., the windowed subsequences) using a sliding temporal window 404. As shown, the time series segmentation system 206 applies multiple sliding windows to the supplemented multivariate time series 110 to generate the windowed subsequences 112.

The sliding temporal window 404 may facilitate one or more windowing operations and be defined by window type, window size, stride length, and starting/ending points. For example, the sliding temporal window 404 can be one of many window types, such as a tumbling window or a hopping window.

To illustrate, a tumbling window segments data points into distinct, consecutive time segments that do not repeat, do not overlap (i.e., non-overlapping), and where a data point cannot belong to more than one window (e.g., $W_1$ is from 1-5 seconds, $W_2$ is from 6-10 seconds, $W_3$ is from 11-15 seconds, etc.). In various implementations, the location of each hop is determined based on stride length. A tumbling window moves or jumps forward in a time series the same distance (e.g., stride length) as the window size of the tumbling window.

A hopping window hops forward in time by a fixed period. Hopping windows may overlap, and data points may belong to multiple windowed subsequences (e.g., $W_1$ is from 1-5 seconds, $W_2$ is from 3-7 seconds, $W_3$ is from 7-10 seconds, etc.). A hopping window has a shorter stride length than the window size. In some instances, a hopping window is referred to as a running or moving window.

In general, the time series segmentation system uses a fixed window size for one instance through a univariate time series. For example, each of the windowed subsequences 112 is the same length (e.g., same time duration), which often results in the same number of data points. In some implementations, the time series segmentation system 206 uses variable window sizes depending on the number, type, or quality of data points included in a particular portion of the univariate time series.

In one or more implementations, the time series segmentation system 206 selects the window size based on one or more approaches. For example, the window size is selected to be a predetermined amount or fraction of the total univariate time series. In some instances, the window size is based on a default time duration based on the type of data in the time series. In various implementations, the window size is based on the number of data points rather than the time duration.

In some implementations, the time series segmentation system 206 determines a window size and/or type based on processing integrations. For example, the time series segmentation system 206 selects a wider, larger window at an early instance and narrows and shrinks the window size in later instances. In some instances, the time series segmentation system 206 selects a smaller, refined window size to target particular portions of the univariate time series on a subsequent pass or interaction. In various implementations, the time series segmentation system 206 allows a user to specify a window size in an interactive interface, as mentioned above.

Other window characteristics include stride length and starting/ending points. Stride length is defined and described above. The time series segmentation system 206 uses starting and ending points to cover the entire span of a univariate time series or a predefined portion, such as within a particular time frame or targeting a particular timestamp.

As noted above, in various implementations, the time series segmentation system 206 partitions the supplemented multivariate time series into small subsequences using a window size M and stride length s and runs over the some or all of the time series. In these implementations, the windowed subsequences 112 that result may be represented as B=(N−M+1)/s batches, where B refers to the number of batches, M to the number of samples, and D to the number of variables. In some implementations, the batch of samples is represented as the tensor of size $X \in \mathbb{R}^{B \times M \times D}$.

FIG. 5 illustrates an example process for generating graph objects from the windowed subsequences using a graph recovery model in accordance with one or more implementations. As shown, FIG. 5 expands on the act 103 of generating graph objects from the windowed subsequences using a graph recovery model. As shown, the act 103 includes using the graph recovery model 114 to generate the graph objects 116 from the windowed subsequences 112.

As mentioned above, graph recovery models generate or recover graph objects that show potential connections between features or variables within the windowed subsequences 112. Indeed, the time series segmentation system 206 aims to recover undirected graphs that capture direct dependence among their nodes or features.

Graph recovery models are often algorithm-based and may employ various methods to recover graph objects. For instance, graph recovery models use methods including regression-based, partial correlation, graphical lasso, Markov network, and/or other types of neural machine learning. For example, the graphical lasso methods include optimization, deep unfolding, and/or tensor-based methods. More particularly, the uGLAD model referred to in this document may utilize an unsupervised deep-unfolding graphical lasso-based approach to recover conditional independence graphs.

Accordingly, as shown, the graph recovery model 114 includes different levels of graph recovery models. At a general level, the graph recovery model 114 includes sparse graph recovery models 500 to run on the windowed subsequences 112. At the next level are conditional independence graph models 505. At the highest level are deep-learning sparse graph recovery models 510, such as the uGLAD model.

In general, the sparse graph recovery models 500 recover graph objects from input data (e.g., the windowed subsequences 112). However, these graph objects may not strongly indicate correlations between features. The conditional independence graph models 505, on the other hand, recover graph objects that include direct dependencies between features by leveraging the concept of conditional independence (CI). The CI property asserts that two variables are independent of each other given a third variable.

In various implementations, the conditional independence graph models 505 and the deep-learning sparse graph recovery models 510 include neural networks that enable adaptive choices of hyperparameters, which in turn improves their efficiency and accuracy in generating graph objects. The deep-learning sparse graph recovery models 510 generate CI graph objects as well as provide increased efficiency and accuracy in generating graph objects, as also discussed below.

As mentioned above, the windowed subsequences 112 may be represented as input X. In these cases, the time series segmentation system 206 utilizes the graph recovery model 114 to run on the input (i.e., X) and outputs a corresponding set of graphs, whose adjacency matrix is represented here by the tensor $P \in \mathbb{R}^{B \times D \times D}$. In various implementations, the time series segmentation system 206 utilizes the conditional independence graph models 505 and/or the deep-learning sparse graph recovery models 510 to ensure the model runs efficiently and that the graph objects 116 capture direct dependencies between the features (e.g., nodes).

To elaborate, CI graph objects capture partial correlations between the features that model direct dependencies between them. Further, the nodes in a CI graph object represent features that are connected by edges having edge weights that include partial correlation values (e.g., ranging from [−1, 1]) signaling positive or negative partial correlation information between nodes. The time series segmentation system 206 uses the edge weights and/or partial correlation values to determine segmentation predictions. Additionally, the partial correlation values enable graph objects to provide understanding and transparency to users by being displayed visually.

As mentioned above, in various implementations, the time series segmentation system 206 utilizes the deep-learning sparse graph recovery models 510. One example of a deep-learning sparse graph recovery model is uGLAD, which employs deep-unfolding (or unrolled) algorithms and is an unsupervised extension of a similar GLAD model. These types of deep-learning sparse graph recovery models 510 solve the graphical lasso (i.e., least absolute shrinkage and selection operator) problem through optimization.

In various instances, the deep-learning sparse graph recovery models 510 utilize a tensor-based implementation that allows for multitask learning and enables a single model (e.g., a single run or a single model) to recover the entire batch of data simultaneously (e.g., batch mode or batch processing). Indeed, the deep-learning sparse graph recovery models 510 are sparse graph recovery machine-learning models that robustly handle missing values by leveraging the multi-task learning ability of the model as well as provide a multi-task learning mode that solves the graphical lasso objective to recover multiple graphs with a single model (e.g., batch mode).

As shown at the bottom of FIG. 5, the graph objects 116 include nodes representing the features and edges that show direct positive or negative partial correlations between the features of the univariate time (i.e., $U_1$) and columns for each of the proxy variables ($v_1$, $v_2$, $v_3$, and $v_4$) corresponding to different time windows. In some instances, a graph object is represented as G. As illustrated, FIG. 5 shows a first graph object $G_1$, a second graph object $G_2$, and a third graph object $G_3$.

FIG. 6 illustrates an example process for determining segmentation timestamps using a conditional similarity model in accordance with one or more implementations. As shown, FIG. 6 expands on the act 104 of determining segmentation timestamps by comparing the graph objects using a conditional similarity model. As shown, the act 104 includes using the conditional similarity model 118 to determine the segmentation timestamps 120 from the graph objects 116.

Conceptually, a conditional similarity model compares two or more of the graph objects 116 to identify when a meaningful change occurs between their corresponding correlations. Often a conditional similarity model compares consecutive graph objects, although this is not strictly required. When a change is detected, in some instances, the time series segmentation system 206 sets the time of one of the graph objects (e.g., the end of a first graph object or the start of a second graph object) as a segmentation timestamp.

Additionally, the conditional similarity model 118 includes a similarity model that is conditioned on the univariate time series. For example, conditional similarity model 118 focuses on graph object correlations (e.g., edges) that directly connect to the node representing the univariate time series (i.e., $U_1$). The conditional similarity model 118 ignores graph object connections between the different proxy variables not directly connected to the univariate time series. Besides focusing on patterns and trends with the univariate time series, by conditioning the similarity model based on the univariate time series, the time series segmentation system 206 reduces the number of calculations the conditional similarity model 118 needs make by ignoring all non-univariate time series graph object connections.

In various implementations, the conditional similarity model 118 includes different functions, algorithms, and models to determine the segmentation timestamps 120. Among those shown, the conditional similarity model 118 includes a similarity function 605 and an allocation algorithm 610.

In various implementations, the similarity function 605 generates an adjacency matrix and uses it to determine an $F_{similarity}$ score. To illustrate, consider two graph objects, $G_1$ and $G_2$. The time series segmentation system 206 utilizes the similarity function 605 to determine an adjacency matrix, X, between $G_1$ and $G_2$, conditioned on the univariate time series. As shown, FIG. 6 includes an example adjacency matrix in connection with the similarity function 605. Further, the adjacency matrix generated by the similarity function 605 ignores the non-univariate time series graph object connections between $G_1$ and $G_2$ (shown as "X").

In various implementations, the adjacency matrix determines the difference in values between each feature connection. To illustrate, suppose the first graph object, $G_1$, has a value of 0.8 between the univariate time series $U_1$ and a given proxy variable $v_n$ (e.g., the edge between $U_1$ and $v_n$ has a correlation value of 0.8). Also, suppose the second graph object, $G_2$, has a value of 0.75 between the univariate time series $U_1$ and the given proxy variable $v_n$. In this example, the adjacency matrix between $G_1$ and $G_2$ includes a difference of −0.05 in the entry where the univariate time series $U_1$ and the given proxy variable $v_n$ meet. In this manner, the adjacency matrix indicates the changes, if any, between the feature connections of $G_1$ and $G_2$.

Additionally, in various implementations, the similarity function 605 determines if the differences between two graph objects satisfy a difference threshold. To elaborate, in some implementations, the time series segmentation system 206 combines one or more of the scores from an adjacency matrix to determine if the combined value satisfies a difference threshold. For example, the time series segmentation system 206 sums up the absolute value of each entry in an adjacency matrix to determine if the combined sum is greater than or equal to the difference threshold. In various implementations, the time series segmentation system 206 determines if any one entry satisfies the same or a different difference threshold (e.g., there must be a significant change between at least one feature pair between the two graph objects).

When the difference threshold is satisfied, then the time series segmentation system 206 uses the similarity function 605 to identify a segmentation timestamp. For example, when two compared graph objects are found to have a significant difference, the time series segmentation system 206 knows at least four timestamps: the start of the first graph object, the end of the first graph object, the start of the second graph object, and the end of the second graph object. Accordingly, the time series segmentation system 206 may select one of these times within this range as a segmentation timestamp. In some implementations, the time series segmentation system 206 selects a segmentation timestamp between two of the timestamps.

In various instances, the time series segmentation system 206 uses different methods for selecting a segmented timestamp based on the window type. For example, for a tumbling window where windowed subsequences do not overlap, the end of the first graph object and the start of the second graph object are the same timestamp for consecutive windows. If the windows are not consecutive, the time series segmentation system 206 may select a timestamp between the two windows for the segmentation timestamps. For a hopping window, the data points overlap, and the time series segmentation system 206 may average between the start of the first graph object and the start of the second graph object as the segmentation timestamp.

In some implementations, the time series segmentation system 206 utilizes an allocation algorithm 610 for the conditional similarity model 118. In general, the allocation algorithm 610 uses a multi-step framework to identify segmentation timestamps 120. For example, the allocation algorithm 610 determines a first order distance of multiple graph objects (conditioned on the univariate time series) and a second order distance by taking the absolute value of the first order distance. Next, as shown, the allocation algorithm 610 filters by a noise threshold to remove data below a noise threshold. The allocation algorithm 610 then identifies the segmentation timestamps 120 from the remaining data.

In additional detail, the time series segmentation system 206 determines a first-order distance sequence, $dG \in \mathbb{R}^B$ by finding the distance of the consecutive graphs in the temporal graph series G. For each relevant entry, $b \in B b \in B$ of dG, the time series segmentation system 206 measures the distance between its recovered graph and the next graph object as shown below, where weights are the partial correlation values of the edges of the CI graph objects.

$$dG[b] = \text{distance}(G_b, G_{b+1}) = \sum_{p,q} (G_b[p, q]) \; \forall \; p, q \in \{1, \ldots, B\}$$

Further, given the sequence dG, the time series segmentation system 206 computes the second-order distance sequence d2G by applying a second distance operation, such as the formulation shown below.

$$d2G[b] = \text{abs}(dG[b] - dG[b-1]), \forall b \in (1, B)$$

In various implementations, the first-order distance measures the change between each recovered graph and its next neighbor, while the second-order distance highlights potential segmentation points.

In various instances, the time series segmentation system 206 then utilizes the allocation algorithm 610 to determine the final segmentation points from the d2G sequence. For example, in some instances, the time series segmentation system 206 filters out small noises in d2G by applying a noise threshold, which is conservative in many instances.

Additionally, in one or more implementations, the allocation algorithm 610 sequentially traverses the sequence d2G and marks one or more of the segmentation timestamps 120 for non-zero values. In some implementations, the allocation algorithm 610 disregards changes representing potential segmentation points when the change occurs within a predetermined time frame and/or if the changes occur less than a threshold number of times (e.g., 5 times) within the window size.

In various implementations, the time series segmentation system 206 coordinates the conditional similarity model 118 with the graph recovery model 114 to determine how to process the graph objects 116 to generate segmentation timestamps 120. For instance, if the graph recovery model 114 generates conditionally independence graph objects, the conditional similarity model 118 applies different methods to determine the segmentation timestamps 120 than if the graph recovery model 114 did not generate CI graph objects.

FIG. 7 illustrates an example process for generating a segmented univariate time series using the segmentation timestamps in accordance with one or more implementations. As shown, FIG. 7 elaborates on the act 105 of generating a segmented univariate time series using the segmentation timestamps. As shown, the act 105 includes the segmentation timestamps 120 and the segmented univariate time series 122.

In various implementations, the time series segmentation system 206 adds, overlays, incorporates, and/or otherwise applies the segmentation timestamps 120 to the univariate time series data 106 to generate the segmented univariate time series 122. For example, the time series segmentation system 206 applies the segmentation timestamps 120 to the univariate time series to identify the beginning and/or end of a segment. In this way, the time series segmentation system 206 generates the segmented univariate time series 122.

In various implementations, the segmented univariate time series 122 includes labels or other indications denoting different segments. For example, FIG. 7 shows that the segmented univariate time series 122 includes a first segment (i.e., Segment 1) and a second segment (i.e., Segment 2).

Figure 8:
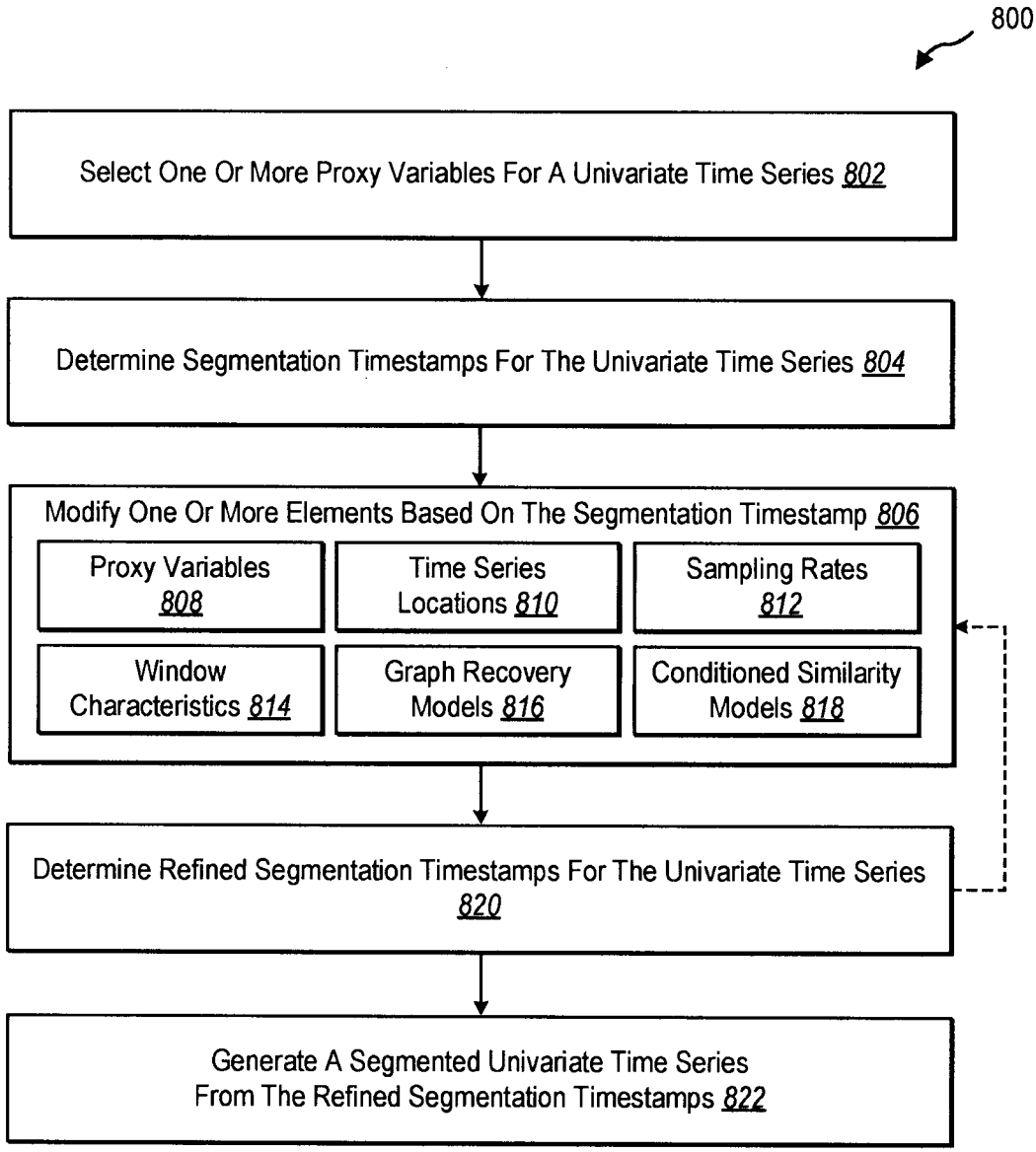
FIG. 8 illustrates an example process flow for determining refined segmentation timestamps for a univariate time series in accordance with one or more implementations.

FIG. 8 illustrates an example process flow for determining refined segmentation timestamps in accordance with one or more implementations. For example, FIG. 8 includes a series of acts 800 that provides high-level actions of the time series segmentation system 206 for determining segmentation timestamps.

As shown, the series of acts 800 includes an act 802 of selecting one or more proxy variables for a univariate time series. For example, the time series segmentation system 206 selects a first set of proxy variables for a univariate time series. In various implementations, the time series segmentation system 206 also selects window characteristics, such as window size, as described above. For instance, the time series segmentation system 206 selects a wide or large initial window size.

As also shown, the series of acts 800 includes an act 804 of determining segmentation timestamps for the univariate time series. For example, the time series segmentation system 206 performs the actions described above of generating a supplemented multivariate time series for the univariate time series, dividing the supplemented multivariate time series into windowed segments, generating graph objects, and determining differences in the graph objects to determine segmentation timestamps.

While still helpful, an initial determination of the segmentation timestamps 120 may imprecisely identify when a segment changes. For example, a segmentation timestamp can be up to a window size away from the precise moment of change. Accordingly, the time series segmentation system 206 may repeat the above processes with a refined, targeted approach.

To illustrate, the series of acts 800 includes an act 806 of modifying the one or more elements based on the segmentation timestamps. The time series segmentation system 206 may modify proxy variable parameters and/or window characteristics. To elaborate, the act 806 includes various elements, such as proxy variables 808, time series locations 810, sampling rates 812, window characteristics 814, graph recover models 816, and conditional similarity models 818.

In various implementations, the time series segmentation system 206 modifies one or more of these events before performing another instance or iteration. For instance, the time series segmentation system 206 adds additional proxy variables (e.g., forming a second set of proxy variables), shrinks the window size, and/or increases the sampling rate for one or more proxy variables. In some instances, the time series segmentation system 206 applies a more sophisticated graph recover model and/or a conditional similarity model.

In one or more implementations, the time series segmentation system 206 determines employs additional and/or overlapping windows. In some instances, the time series segmentation system 206 determines to add, or modify in place of changing the window size and the window type (e.g., from a tumbling window to a hopping window). In various implementations, the time series segmentation system 206 varies by stride length. Indeed, in general, the time series segmentation system 206 changes the proxy variable parameters and window characteristics to better identify the precise moment a change occurred in the univariate time series.

Additionally, the time series segmentation system 206 may focus on subsequences surrounding the previously determined segmentation timestamps by changing the starting/ending locations to locations surrounding the determined segmentation timestamps. For example, the time series segmentation system 206 applies a refined window to the subsequences of the supplemented multivariate time series corresponding to the previously determined segmentation timestamps while omitting other portions of the supplemented multivariate time series where no changes were detected in previous instances. In this manner, the time series segmentation system 206 conserves computing resources and time by using fewer windowed subsequences.

As shown, the series of acts 800 includes an act 820 of determining refined segmentation timestamps for the univariate time series. For example, the time series segmentation system 206 determines refined segmentation timestamps that more accurately indicate the precise location of a segment change within the univariate time series. Additionally, as shown by the dashed line in FIG. 8, the time series segmentation system 206 may repeat the act 806 and the act 820 multiple times to further refine the time locations of the segmentation timestamps for the univariate time series.

Upon determining the refined segmentation timestamps, the time series segmentation system 206 generates the segmented univariate time series. To illustrate, the series of acts 800 includes an act 822 of generating a segmented univariate time series from the refined timestamps.

Figure 9:
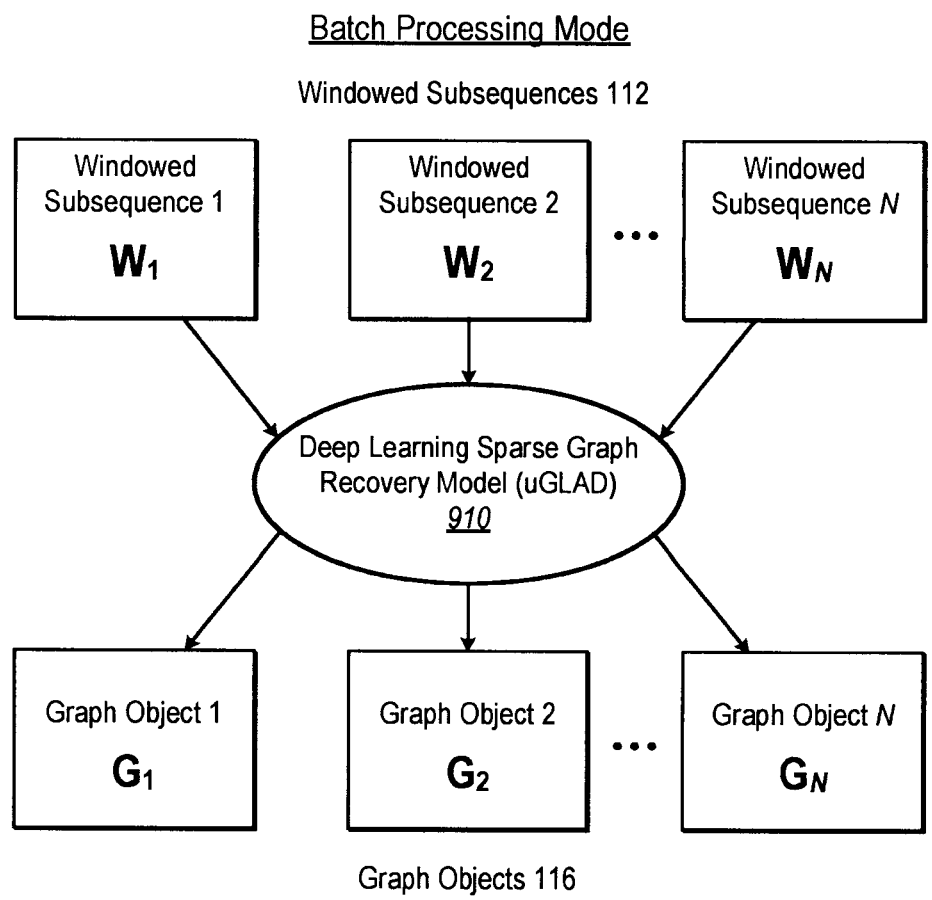
FIG. 9 illustrates an example process flow for batch processing graph objects in accordance with one or more implementations.

FIG. 9 illustrates an example process flow for batch processing graph objects in accordance with one or more implementations. As shown, FIG. 9 provides an example of the time series segmentation system 206 applying batch processing mode. As noted above, in various implementations, the time series segmentation system 206 utilizes deep-learning sparse graph recovery models such as uGLAD to convert any number of windowed subsequences into graph objects in a single run, without needing parallel processing (e.g., not performed by multiple model instances in parallel).

To illustrate, FIG. 9 shows the windowed subsequences 112 (i.e., $W_1, W_2, \ldots, W_N$), a deep-learning sparse graph recovery model 910, and graph objects 116 (i.e., $G_1, G_2, \ldots, G_N$). For example, the windowed subsequences 112 are formed as input matrices and provided to the deep-learning sparse graph recovery model 910 in a single batch. The deep-learning sparse graph recovery model 910 generates a corresponding number of graph objects in a single pass or instance of the model using shared parameters.

In various implementations, the deep-learning sparse graph recovery model 910 is one of the examples of the deep-learning sparse graph recovery models 510 described above. For instance, the deep-learning sparse graph recovery model 910 is trained with batches to learn parameter sharing and transfer learning when batch processing is performed.

In various implementations, the time series segmentation system 206 executes the deep-learning sparse graph recovery model 910 (e.g., uGLAD) in batch mode to recover and/or obtain all the underlying precision matrices (e.g., the windowed subsequences 112) at once/simultaneously, without the need for parallel processing.

In some implementations, the time series segmentation system 206 may follow $\theta \leftarrow uGLA(X)$, where $\theta \in \mathbb{R}^{B \times M \times D}$. Additionally, in these implementations, the time series segmentation system 206 utilizes parameter sharing across the different tasks to help maintain robustness against noisy data and facilitate transfer learning. By using the deep-learning sparse graph recovery model 910, the time series segmentation system 206 obtains a series of temporal CI graph objects represented by the adjacency matrices $G=[G_1, G_2, \ldots, G_B] \in \mathbb{R}^{B \times D \times D}$ using a partial correlation matrix P. Further, each entry of the adjacency matrix is equal to the partial correlation value, $G_b[p, q]=\rho(D_p, D_q)$ for the $b^{th}$ batch, where $D^k$ represents the $k^{th}$ time series variable.

Figure 10:
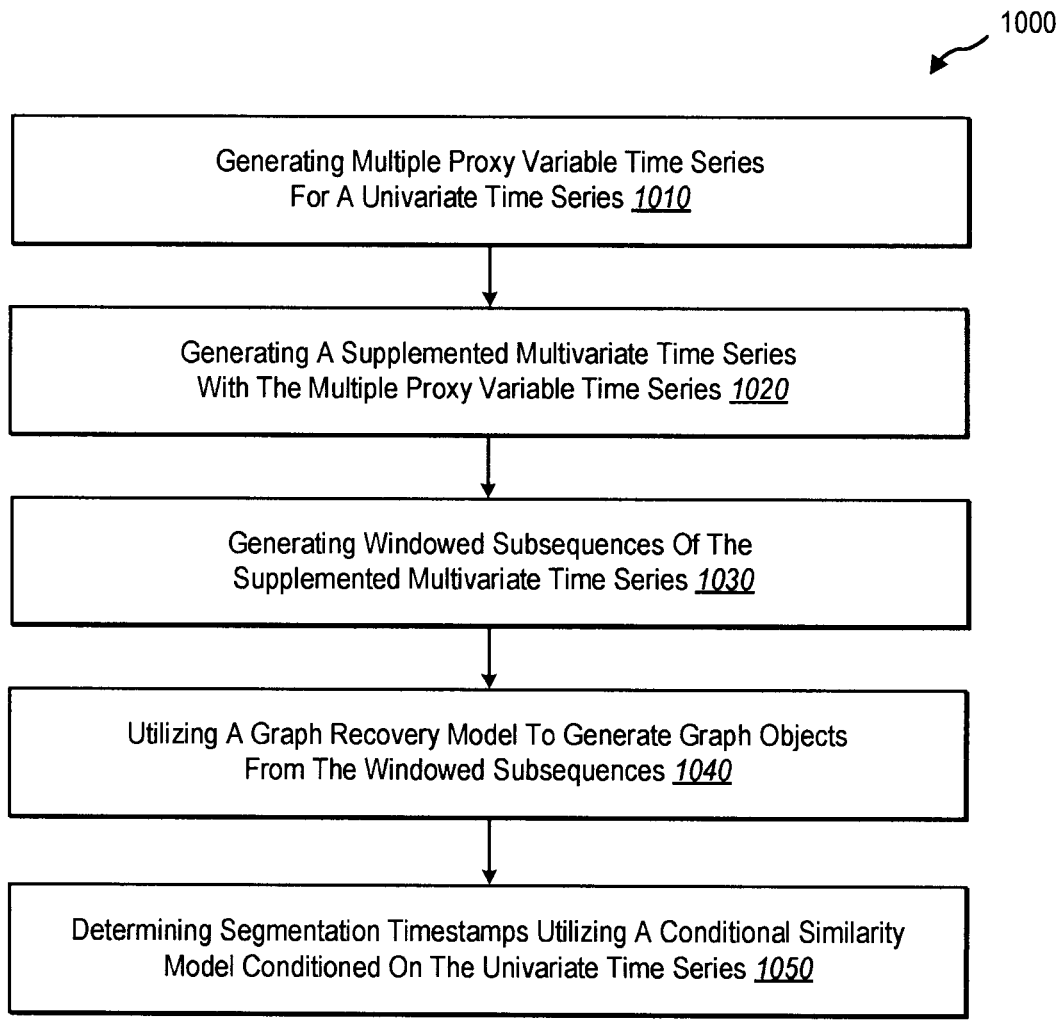
FIG. 10 illustrates an example series of acts for generating segmented univariate time series data in accordance with one or more implementations.

Turning now to FIG. 10, this figure illustrates an example flowchart that includes a series of acts 1000 for utilizing the time series segmentation system 206 in accordance with one or more implementations. In particular, FIG. 10 illustrates an example series of acts for generating segmented univariate time series data in accordance with one or more implementations.

While FIG. 10 illustrates acts according to one or more implementations, alternative implementations may omit, add to, reorder, and/or modify any of the acts shown. Further, the acts of FIG. 10 can be performed as part of a method (e.g., a computer-implemented method). Alternatively, a non-transitory computer-readable medium can include instructions that, when executed by a processing system comprising a processor, cause a computing device to perform the acts of FIG. 10. In still further implementations, a system (e.g., a processing system comprising a processor) can perform the acts of FIG. 10.

In one or more implementations, the system includes univariate time series data, a sparse graph recovery model that generates graph objects from multiple portions of time series data, and/or a conditional similarity model that determines differences between two or more graph objects. In various implementations, the system includes a processor and a computer memory including instructions that, when executed by the processor, cause the system to carry out various operations.

As shown, the series of acts 1000 includes an act 1010 of generating multiple proxy variable time series for a univariate time series. For example, the act 1010 involves generating multiple proxy variable time series for a univariate time series, where a first proxy variable time series of the multiple proxy variable time series is based on the univariate time series.

In various implementations, the act 1010 includes generating the first proxy variable time series by interpolating the univariate time series at a first sampling rate. In some implementations, the act 1010 includes generating a first proxy variable time series by interpolating the univariate time series at a first sampling rate, and/or generating a second proxy variable time series by interpolating the univariate time series at a second sampling rate that is different from the first sampling rate. In one or more implementations, the act 1010 includes generating an additional proxy variable time series by interpolating the univariate time series. In some instances, the proxy variable time series is a polynomial proxy variable. In various implementations, the act 1010 includes determining a data type of the univariate time series and determining the multiple proxy variable time series based on the data type.

As further shown, the series of acts 1000 includes an act 1020 of generating a supplemented multivariate time series with the multiple proxy variable time series. For instance, in example implementations, the act 1020 involves generating a supplemented multivariate time series by supplementing the univariate time series with the multiple proxy variable time series.

As further shown, the series of acts 1000 includes an act 1030 of generating windowed subsequences of the supplemented multivariate time series. For instance, in example implementations, the act 1030 involves grouping portions of the supplemented multivariate time series by a window size to generate windowed subsequences of the supplemented multivariate time series. In various implementations, the window size corresponds to a data overlapping hopping window or a non-overlapping tumbling window.

As further shown, the series of acts 1000 includes an act 1040 of utilizing a sparse graph recovery model to generate graph objects from the windowed subsequences. For instance, in example implementations, the act 1040 involves generating graph objects from the windowed subsequences by utilizing a sparse graph recovery model. In some implementations, the act 1040 includes utilizing a conditional independence sparse graph recovery model that generates graph objects that exhibit partial correlation between variables. In various implementations, the sparse graph recovery model generates conditional independence graph objects that exhibit partial correlation between variables.

In various implementations, the act 1040 includes determining a constant correlation between two proxy variable time series of the multiple proxy variable time series across the univariate time series and removing one of the two proxy variable time series. In one or more implementations, the act 1040 includes generating additional graph objects from the windowed subsequences utilizing an additional sparse graph recovery model that is different from the sparse graph recovery model and determining that the graph objects and the additional graph objects are within a threshold similarity. In some implementations, the act 1040 includes generating a visual graph of nodes and edges, where the edges indicate a positive or negative partial correlation between connected nodes. In various implementations, the act 1040 includes generating multiple graph objects from the windowed subsequences at the same time as part of a batch operation that utilizes one instance of the sparse graph recovery model using shared parameters.

In various implementations, the act 1040 includes generating a visual graph of nodes and edges, where the edges indicate a positive or negative partial correlation between connected nodes. In some implementations, the act includes generating an adjacency matrix or an adjacency list indicating partial correlations between corresponding nodes and edges between two graph objects. In one or more implementations, the act 1040 also includes generating multiple graph objects from the windowed subsequences at a same time as part of a batch operation that utilizes one iteration of the sparse graph recovery model. In some instances, the sparse graph recovery model is an unsupervised deep-learning sparse graph recovery model trained to generate batches of graph objects.

As further shown, the series of acts 1000 includes an act 1050 of determining segmentation timestamps utilizing a conditional similarity model conditioned on the univariate time series. For instance, in example implementations, the act 1050 involves determining one or more segmentation timestamps indicating one or more segment changes in the supplemented multivariate time series utilizing a conditional similarity model conditioned on the univariate time series.

In one or more implementations, the act 1050 includes comparing a first graph object to a second graph object utilizing the conditional similarity model to determine that a difference between the first graph object and the second graph object satisfies a difference threshold and determining a first segmentation timestamp based on a segmentation timestamp of the first graph object. In some implementations, the conditional similarity model conditioned on the univariate time series ignores graph object connections between two of the multiple proxy variable time series. In various implementations, the act 1050 includes generating a segmented univariate time series by segmenting the supplemented multivariate time series based on the one or more segmentation timestamps.

In some implementations, the similarity model (e.g., conditional similarity model) includes allocation algorithm that determines the one or more segmentation timestamps based on determining a first order distance and a second order distance from the graph objects. In various implementations, the first order distance captures a distance between consecutive graph objects and the second order distance generates absolute values based on the first order distance. In various implementations, the allocation algorithm further includes reducing the second order distance by filtering out sequence values below a noise threshold to generate a filtered sequence and traversing the filtered sequence for non-zero values to identify the one or more segmentation timestamps.

In some implementations, the series of acts 1000 includes additional acts. For example, the series of acts 1000 includes the acts of generating a segmented univariate time series by segmenting the univariate time series based on the one or more segmentation timestamps; generating, using a refined window size, additional windowed subsequences from the multivariate time series data based on the one or more segmentation timestamps, where the refined window size is smaller than the window size and determining one or more refined segmentation timestamps from the additional windowed subsequences; and updating locations of segments within the segmented univariate time series based on the one or more refined segmentation timestamps.

In some implementations, the series of acts 1000 includes acts of generating multiple proxy variable time series for the univariate time series; generating a first supplemented multivariate time series by supplementing the univariate time series with the multiple proxy variable time series; grouping portions of the first supplemented multivariate time series by a first window size to generate windowed subsequences of the first supplemented multivariate time series; generating graph objects from the windowed subsequences utilizing the first sparse graph recovery model; and determining one or more segmentation timestamps indicating one or more segment changes in the first supplemented multivariate time series utilizing the first conditional similarity model conditioned on the univariate time series.

In additional implementations, the series of acts 1000 also includes acts of generating an additional proxy variable time series for the univariate time series based on the one or more segmentation timestamps; generating a second supplemented multivariate time series by supplementing the univariate time series with the additional proxy variable time series and the multiple proxy variable time series; generating additional windowed subsequences from the second supplemented multivariate time series; generating additional graph objects from the additional windowed subsequences utilizing a second sparse graph recovery model; and determining one or more refined segmentation timestamps from the additional graph objects utilizing a second conditional similarity model conditioned on the univariate time series. In some instances, the additional windowed subsequences utilize a second window size that has a smaller window size than the first window size, and/or the additional windowed subsequences are fewer in number than the windowed subsequences. In some implementations, the first sparse graph recovery model is a general sparse graph recovery model, and the second sparse graph recovery model is a specialized sparse graph recovery model.

In various implementations, the series of acts 1000 includes the acts of generating a proxy variable time series for a univariate time series; generating a supplemented multivariate time series by supplementing the univariate time series with the proxy variable time series; grouping portions of the supplemented multivariate time series by a window size to generate windowed subsequences of the supplemented multivariate time series; generating graph objects from the windowed subsequences utilizing a sparse graph recovery model; determining one or more segmentation timestamps indicating one or more segment changes in the supplemented multivariate time series utilizing a conditional similarity model conditioned on the univariate time series; and generating a segmented univariate time series by segmenting the supplemented multivariate time series based on the one or more segmentation timestamps.

Figure 11:
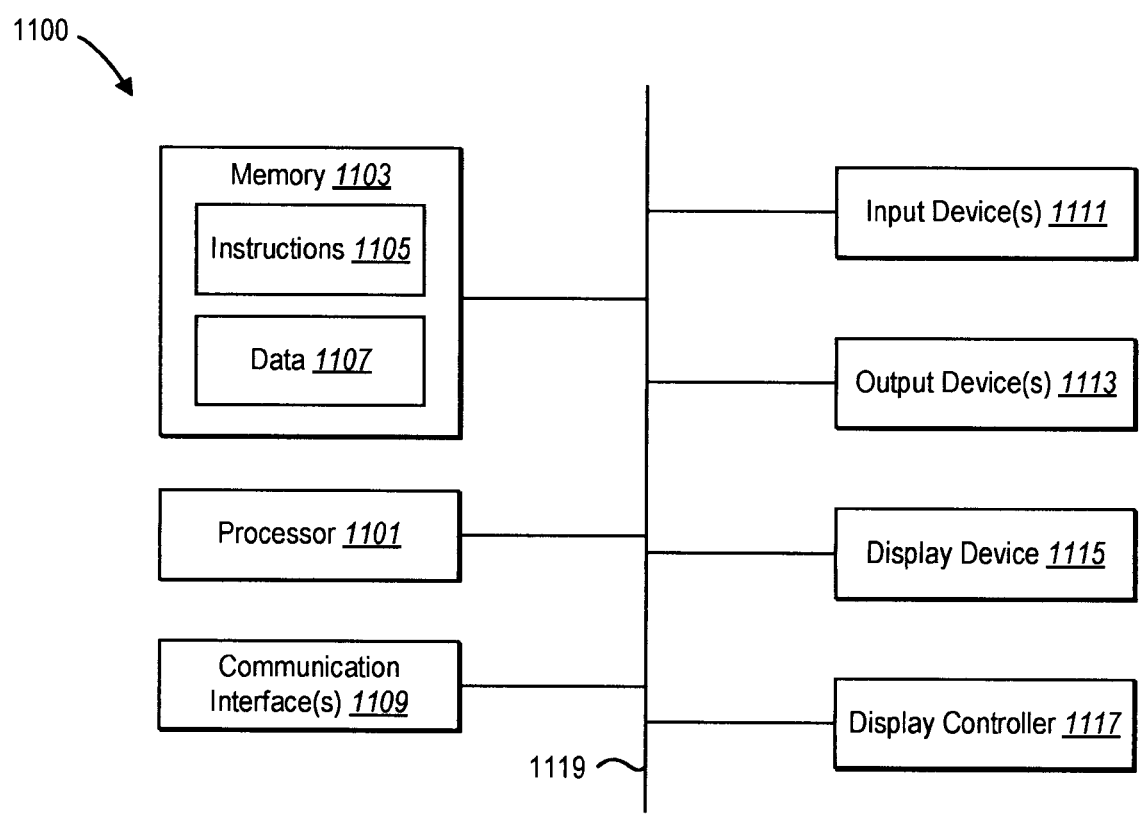
FIG. 11 illustrates example components included within a computer system.

FIG. 11 illustrates certain components that may be included within a computer system 1100. The computer system 1100 may be used to implement the various computing devices, components, and systems described herein. As used herein, a "computing device" refers to electronic components that perform a set of operations based on a set of programmed instructions. Computing devices include groups of electronic components, client devices, server devices, etc.

In various implementations, the computer system 1100 represents one or more of the client devices, server devices, or other computing devices described above. For example, the computer system 1100 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1100 includes a processing system including a processor 1101. The processor 1101 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 1101 may be referred to as a central processing unit (CPU). Although the processor 1101 shown is just a single processor in the computer system 1100 of FIG. 11, in an alternative configuration, a combination of processors (e.g., an ARM and DSP) could be used.

The computer system 1100 also includes memory 1103 in electronic communication with the processor 1101. The memory 1103 may be any electronic component capable of storing electronic information. For example, the memory 1103 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1105 and the data 1107 may be stored in the memory 1103. The instructions 1105 may be executable by the processor 1101 to implement some or all of the functionality disclosed herein. Executing the instructions 1105 may involve the use of the data 1107 that is stored in the memory 1103. Any of the various examples of modules and components described herein may be implemented, partially or wholly, as instructions 1105 stored in memory 1103 and executed by the processor 1101. Any of the various examples of data described herein may be among the data 1107 that is stored in memory 1103 and used during the execution of the instructions 1105 by the processor 1101.

A computer system 1100 may also include one or more communication interface(s) 1109 for communicating with other electronic devices. The one or more communication interface(s) 1109 may be based on wired communication technology, wireless communication technology, or both. Some examples of the one or more communication interface(s) 1109 include a Universal Serial Bus (USB), an Ethernet adapter, a wireless adapter that operates in accordance with an Institute of Electrical and Electronics Engineers (IEEE) 1102.11 wireless communication protocol, a Bluetooth® wireless communication adapter, and an infrared (IR) communication port.

A computer system 1100 may also include one or more input device(s) 1111 and one or more output device(s) 1113. Some examples of the one or more input device(s) 1111 include a keyboard, mouse, microphone, remote control device, button, joystick, trackball, touchpad, and light pen. Some examples of the one or more output device(s) 1113 include a speaker and a printer. A specific type of output device that is typically included in a computer system 1100 is a display device 1115. The display device 1115 used with implementations disclosed herein may utilize any suitable image projection technology, such as liquid crystal display (LCD), light-emitting diode (LED), gas plasma, electroluminescence, or the like. A display controller 1117 may also be provided, for converting data 1107 stored in the memory 1103 into text, graphics, and/or moving images (as appropriate) shown on the display device 1115.

The various components of the computer system 1100 may be coupled together by one or more buses, which may include a power bus, a control signal bus, a status signal bus, a data bus, etc. For clarity, the various buses are illustrated in FIG. 11 as a bus system 1119.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the time series segmentation system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for segmenting univariate time series data comprising:
    generating multiple proxy variable time series for a univariate time series, wherein a first proxy variable time series of the multiple proxy variable time series is based on the univariate time series;
    generating a supplemented multivariate time series by supplementing the univariate time series with the multiple proxy variable time series;
    grouping portions of the supplemented multivariate time series by a window size to generate windowed subsequences of the supplemented multivariate time series;
    generating graph objects from the windowed subsequences utilizing a sparse graph recovery model, wherein the graph objects indicate correlation values between nodes; and
    determining one or more segmentation timestamps indicating one or more segment changes in the supplemented multivariate time series utilizing a conditional similarity model conditioned on the univariate time series that determines when changes between correlation values in graph objects meet or exceed a difference threshold.

2. The computer-implemented method of claim 1, further comprising generating the first proxy variable time series by interpolating the univariate time series at a first sampling rate.

3. The computer-implemented method of claim 1, further comprising generating a segmented univariate time series by segmenting the supplemented multivariate time series based on the one or more segmentation timestamps.

4. The computer-implemented method of claim 1, further comprising:
    determining a data type of the univariate time series; and
    determining the multiple proxy variable time series based on the data type.

5. The computer-implemented method of claim 1, further comprising:

determining a constant correlation between two proxy variable time series of the multiple proxy variable time series across the univariate time series; and removing one of the two proxy variable time series.

6. The computer-implemented method of claim 1, further comprising:

generating additional graph objects from the windowed subsequences utilizing an additional sparse graph recovery model that is different from the sparse graph recovery model; and determining that the graph objects and the additional graph objects are within a threshold similarity.

7. The computer-implemented method of claim 1, wherein generating the graph objects from the windowed subsequences includes generating a visual graph of nodes and edges, where the edges indicate a positive or negative partial correlation between connected nodes.

8. The computer-implemented method of claim 1, further comprising generating multiple graph objects from the windowed subsequences at a same time as part of a batch operation that utilizes one instance of the sparse graph recovery model and shared parameters.

9. The computer-implemented method of claim 1, wherein the sparse graph recovery model generates conditional independence graph objects that exhibit partial correlation between variables.

10. The computer-implemented method of claim 1, further comprising:

comparing a first graph object to a second graph object utilizing the conditional similarity model to determine that a difference between the first graph object and the second graph object satisfies a difference threshold; and determining a first segmentation timestamp based on a segmentation timestamp of the first graph object.

11. The computer-implemented method of claim 1, wherein the conditional similarity model conditioned on the univariate time series ignores graph object connections between two of the multiple proxy variable time series.

12. A system comprising:

a univariate time series;

a first sparse graph recovery model that generates graph objects from multiple portions of time series data;

a first conditional similarity model that determines differences between two or more graph objects;

a processor; and a computer memory comprising instructions that, when executed by the processor, cause the system to carry out operations comprising:

generating multiple proxy variable time series for the univariate time series;

generating a first supplemented multivariate time series by supplementing the univariate time series with the multiple proxy variable time series;

grouping portions of the first supplemented multivariate time series by a first window size to generate windowed subsequences of the first supplemented multivariate time series;

generating graph objects from the windowed subsequences utilizing the first sparse graph recovery model, wherein the graph objects indicate correlation values between nodes; and determining one or more segmentation timestamps indicating one or more segment changes in the first supplemented multivariate time series utilizing the first conditional similarity model conditioned on the univariate time series that determines when changes between correlation values in graph objects meet or exceed a difference threshold.

13. The system of claim 12, further comprising additional instructions that, when executed by the processor, cause the system to carry out an operation comprising:

generating an additional proxy variable time series for the univariate time series based on the one or more segmentation timestamps;

generating a second supplemented multivariate time series by supplementing the univariate time series with the additional proxy variable time series and the multiple proxy variable time series;

generating additional windowed subsequences from the second supplemented multivariate time series;

generating additional graph objects from the additional windowed subsequences utilizing a second sparse graph recovery model; and determining one or more refined segmentation timestamps from the additional graph objects utilizing a second conditional similarity model conditioned on the univariate time series.

14. The system of claim 13, wherein the additional windowed subsequences utilize a second window size that has a smaller window size than the first window size.

15. The system of claim 14, wherein the additional windowed subsequences are fewer in number than the windowed subsequences.

16. The system of claim 13, wherein the first sparse graph recovery model is a general sparse graph recovery model, and the second sparse graph recovery model is a specialized sparse graph recovery model.

17. A computer-implemented method for segmenting univariate time comprising:

generating a proxy variable time series for a univariate time series;

generating a supplemented multivariate time series by supplementing the univariate time series with the proxy variable time series;

grouping portions of the supplemented multivariate time series by a window size to generate windowed subsequences of the supplemented multivariate time series;

generating graph objects from the windowed subsequences utilizing a sparse graph recovery model, wherein the graph objects indicate correlation values between nodes;

determining one or more segmentation timestamps indicating one or more segment changes in the supplemented multivariate time series utilizing a conditional similarity model conditioned on the univariate time series that determines when changes between correlation values in graph objects meet or exceed a difference threshold; and generating a segmented univariate time series by segmenting the supplemented multivariate time series based on the one or more segmentation timestamps.

18. The computer-implemented method of claim 17, further comprising:

generating a first proxy variable time series by interpolating the univariate time series at a first sampling rate; and generating a second proxy variable time series by interpolating the univariate time series at a second sampling rate that is different from the first sampling rate.

19. The computer-implemented method of claim 17, further comprising generating an additional proxy variable time series by interpolating the univariate time series.

20. The computer-implemented method of claim 17, wherein the proxy variable time series is a polynomial proxy variable.

* * * * *